(12) United States Patent
Miyazaki et al.

(10) Patent No.: US 7,265,895 B2
(45) Date of Patent: Sep. 4, 2007

(54) MICROCAPSULE FOR ELECTROPHORETIC DISPLAY DEVICE, PROCESS FOR MANUFACTURING THE SAME AND USE THEREOF

(75) Inventors: Atsushi Miyazaki, Fujimi-machi (JP); Makoto Matsumoto, Himeji (JP); Mitsuo Kushino, Hyogo (JP); Teruo Kikuta, Nagaokakyo (JP); Akio Ito, Suita (JP)

(73) Assignees: Seiko Epson Corporation, Tokyo (JP); Nippon Shokubai Co., Ltd., Osaka (JP)

( * ) Notice: Subject to any disclaimer, the term of this patent is extended or adjusted under 35 U.S.C. 154(b) by 21 days.

(21) Appl. No.: 11/123,157

(22) Filed: May 6, 2005

(65) Prior Publication Data

US 2005/0259312 A1    Nov. 24, 2005

(30) Foreign Application Priority Data

May 24, 2004  (JP) ............................. 2004-153790
May 24, 2004  (JP) ............................. 2004-153791

(51) Int. Cl.
  *G02B 26/00*  (2006.01)
  *G03G 17/04*  (2006.01)

(52) U.S. Cl. .................. 359/296; 359/900; 430/32; 430/34; 430/38

(58) Field of Classification Search ................ 359/296; 430/32, 34, 38; 345/105, 107; 204/450, 204/600

See application file for complete search history.

(56) References Cited

U.S. PATENT DOCUMENTS 2,800,457 A   7/1957  Green et al.
6,242,099 B1 *  6/2001  Grandmontagne et al. ................ 428/402.2
6,951,745 B2 * 10/2005  Nomoto et al. ............. 435/118

FOREIGN PATENT DOCUMENTS

| JP | 50-15115 | 6/1975 |
| JP | 64-86116 | 3/1989 |
| JP | 2551783 | 8/1996 |
| JP | 2004-37507 | 2/2004 |
| JP | 2004-53679 | 2/2004 |
| JP | 2004-102235 | 4/2004 |
| JP | 2004-267877 | 9/2004 |
| JP | 2004-271747 | 9/2004 |

* cited by examiner

Primary Examiner—Ricky Mack
Assistant Examiner—Tuyen Tra
(74) Attorney, Agent, or Firm—Roylance, Abrams, Berdo & Goodman, L.L.P.

(57) ABSTRACT

An object of the present invention is to provide a microcapsule for an electrophoretic display device which can suppress reduction in later contrast even when the electrophoretic display device is allowed to stand under the high temperature and high humidity condition, favorably, under the high temperature and high humidity condition for a long time (e.g. under 60° C., 90% RH for 24 hours). As a means of achieving this object, a microcapsule according to the present invention for an electrophoretic display device comprises an electrophoretic fine particle and a solvent both of which are encapsulated in a shell, and is characterized in that an amount of an alkaline metal ion in the whole microcapsule is 150 ppm or smaller.

10 Claims, No Drawings

MICROCAPSULE FOR ELECTROPHORETIC DISPLAY DEVICE, PROCESS FOR MANUFACTURING THE SAME AND USE THEREOF

BACKGROUND OF THE INVENTION

A. Technical Field

The present invention relates to: a microcapsule for an electrophoretic display device in which an electrophoretic fine particle and a solvent are encapsulated in a shell; a process for manufacturing the same; and a sheet for an electrophoretic display device using the microcapsule.

B. Background Art

An electrophoretic display device is a non-emission-type display device using electrophoretic phenomenon of a pigment particle in a dispersion liquid in which an electrophoresing pigment fine particle is dispersed in a coloring solvent. More particularly, the electrophoretic display device has hitherto been known as a device having a structure in which the dispersion liquid is encapsulated into a space provided between counter electrode substrates (films), at least one of which is transparent, in which a voltage is applied to a prescribed position between both electrode substrates to electrophores an electrophoretic fine particle, and display is performed utilizing a difference in an optical density generated between other position, and has many excellent properties such as wide viewing angle property, long time memorizing property without power (continuous supply) and low power consumption.

In recent years, instead of the prior electrophoretic display device in which the aforementioned dispersion liquid is encapsulated as it is into a space between counter electrode substrates (for example, see patent document 1 below), an electrophoretic display device having a structure in which microcapsules in which the aforementioned dispersion liquid is encapsulated in a shell (capsule shell; also referred to as wall film, the same hereinafter) as a wall material are spread between counter electrode substrates (for example, see patent documents 2 and 3 below) are positively developed and researched, and various performances and functions such as long stability of display, responsiveness, contrast and rewritable times of display are greatly improved as compared with the aforementioned prior electrophoretic display device.

As microcapsulating technique which can be applied when a microcapsule for an electrophoretic display device using the aforementioned dispersion liquid as a core substance is prepared, there are a so-called interface segmentation method such as a coacervation method (phase separation method) (for example, see patent document 4 below), a melting degradation cooling method and a powder bed method, and a so-called interface reaction method such as an interface polymerization method, an in-situ method, an in-liquid curing film (covering) method (orifice method) and an interface reaction method (inorganic chemistry reaction method). Inter alia, a coacervation method is generally suitable since the method has advantages that a strength and a thickness of a shell are easily controlled, and a shell of plural layers can be formed. For example, a microcapsule having a shell obtained from gelatin and gum arabic as essential raw materials by the coacervation method is well known as a microcapsule for an electrophoretic display device (for example, see patent document 2 below).

When an electrophoretic display devise using a microcapsule is tried to be applied to a variety of display devices in the various utility fields, further improvement in performance in various performances such as contrast greatly influencing on clearness of an image is earnestly desired.

[Patent Document 1] JP-B-015115/1975 (Kokoku)
[Patent Document 2] Japanese Patent No. 2551783
[Patent Document 3] JP-A-086116/1989 (Kokai)
[Patent Document 4] U.S. Pat. No. 2,800,457

However, the prior electrophoretic display device using a microcapsule has the problem that, when allowed to stand under the high temperature and high humidity condition, in particular, when allowed to stand under the high temperature and high humidity condition for a long time (e.g. under 60° C., 90% RH for 24 hours), remarkable reduction in contrast thereafter is recognized.

SUMMARY OF THE INVENTION

A. Object of the Invention

Then, an object of the present invention is to provide: a microcapsule for an electrophoretic display device which can suppress reduction in later contrast even when the electrophoretic display device is allowed to stand under the high temperature and high humidity condition, favorably, under the high temperature and high humidity condition for a long time (e.g. under 60° C., 90% RH for 24 hours); a process for manufacturing the same; and a sheet for an electrophoretic display device using the same.

B. Disclosure of the Invention

In order to attain the aforementioned object, the present inventors intensively studied. During the process, the present inventors paid their attention to the presence of various ionic substances, particularly, an alkaline metal ion comprising $Li^+$, $Na^+$, $K^+$, $Rb^+$, $Cs^+$ and $Fr^+$, which can be contained in a microcapsule for an electrophoretic display device, and found out that, if the ionic substances in the whole microcapsule are decreased, particularly, if an amount (concentration) of the above ion in the whole microcapsule is not higher than a prescribed value, then the aforementioned object can be easily attained. Specifically, a large amount of compounds including various ionic substances have hitherto been used as raw materials for the shell or as such as acids or neutralizing agents in processes for preparation of microcapsules for electrophoretic display devices The ionic substance including the above alkaline metal ion can be contained not only in a core substance (a liquid containing an electrophoretic fine particle and a solvent) encapsulated in a shell but also in a shell itself (a large amount of the ion is contained, particularly, in a shell). In the case where a shell is in the moisture absorbed state such as the case where once placed under the high temperature and high humidity condition for a long time, when a constant voltage is applied between both electrodes of an electrophoretic display device, a shell which should usually function as a resistor becomes in the electrically conductive state, an alkaline metal ion contained in the whole microcapsule is flown into a shell part, and a leakage current is generated and, as a result, it is thought that it becomes difficult to apply a prescribed voltage, flowability of an electrophoretic fine particle is reduced and, additionally, this current is flown through also a microcapsule at a position other than a prescribed position, whereby, clear display can not be performed, and sufficient contrast is not obtained. Thus, the present inventors repeated experiments and studies about processes which can decrease the ionic substance (particularly, the above alkaline metal ion) contained in the whole microcapsule for an electrophoretic display device. As a result, they found out two novel methods (processes).

Specifically, as to the first method (process), the present inventors found out that, as a method by which a microcapsule for an electrophoretic display device having the aforementioned amount (concentration) of an alkaline metal ion of a particular value or smaller can be easily obtained, a method of using a liquid containing a hydrophobic solvent and an electrophoretic fine particle as a core substance, and a particular compound in which polyamine and polycarboxylic acid are bound to a nonionic surfactant as a water-soluble surfactant for dispersing the core substance into an aqueous medium and, at the same time, using a water-soluble compound having an epoxy group or an episulfide group as a water-soluble compound to be added after dispersion, and further reacting them, that is, reacting a polyamine part or a polycarboxylic acid part and an epoxy group or an episulfide group to form a shell on a surface of the core substance (liquid droplet surface). In the present specification, an episulfide group indicates a functional group in which an oxygen atom in an epoxy group is replaced with a sulfur atom, and is referred to as thioepoxy group or epithio group in some cases.

In this first method (process), a particular compound used as a water-soluble surfactant also plays a role as a raw material compound contributing to formation of a shell like a water-soluble compound by the aforementioned reaction with the water-soluble compound having an epoxy group or an episulfide group and, by the fact that these are a raw material compound for a shell, a microcapsule can be obtained in which an amount of an alkaline metal ion, which was contained in a large amount previously, in a shell is sufficiently reduced.

In addition, in this first method (process), since the raw material compound having an epoxy group or an episulfide group is generally stable in the free state in an aqueous medium, but exhibits high reactivity to a polyamine part and a polycarboxylic acid part of a particular surfactant compound, the compound easily performs chemical bonding even at a low temperature, and has a nature that the polyamine part or polycarboxylic acid part and the epoxy group or episulfide group are electrostatically attracted, whereby, this can easily respond to core substances having a wide particle diameter, additionally, a shell can be formed on a surface of the core substance (liquid droplet surface) highly selectively, very effectively and excellently controllably, and since it is not necessary to use various additives such as a pH adjusting agent which generate an alkaline metal ion, or its use amount can be greatly reduced, also thereby, a microcapsule can be obtained in which an amount of an alkaline metal ion in a shell is sufficiently reduced. In this case, at the same time, a microcapsule in which an amount of an alkaline metal ion in a core substance encapsulated in a shell is sufficiently reduced is obtained.

Further, in the aforementioned first method (process), addition of a particular surfactant compound and a raw material compound having an epoxy group, and reaction of them are repeated, whereby, a shell composed of plural layers can be formed on a surface of a core substance (liquid droplet surface). Therefore, a shell having a very high strength and a shell having tackiness on a surface layer can be freely formed by appropriately setting the conditions. In addition, since a microcapsule obtained by the aforementioned first method (process) becomes to have appropriate hydrophilicity due to physical property of a shell, stability of such as dispersibility in an aqueous solvent is enhanced regardless of its particle diameter. Therefore, there is no aggregation of microcapsules in each preparation step, and a microcapsule can be obtained very stably and at a high yield.

On the other hand, as to the second method (process), the present inventors found out that, if there is carried out a novel method (process) comprising a step of causing a microcapsule for an electrophoretic display device (wherein the microcapsule is obtained via a microcapsulating step) to coexist with an ion-exchange resin in an aqueous medium, then the ionic substance can effectively be removed (desalted) from the microcapsule (particularly, from its shell portion), so that the aforementioned object can be attained all at once.

Based on the aforementioned findings, the present invention was completed.

Therefore, a microcapsule according to the present invention for an electrophoretic display device comprises an electrophoretic fine particle and a solvent both of which are encapsulated in a shell, and is characterized in that an amount of an alkaline metal ion in the whole microcapsule is 150 ppm or smaller.

A first process according to the present invention for manufacturing a microcapsule for an electrophoretic display device comprises the following steps of: dispersing a core substance into an aqueous medium containing a water-soluble surfactant wherein the core substance is a liquid containing a hydrophobic solvent and an electrophoretic fine particle; and thereafter adding a water-soluble compound to the aqueous medium; thereby forming a shell on a surface of the core substance; and is characterized in that: a compound (A) represented by the following general formula (1):

$$R^1—(CH_2—CH_2—O—)_n—X—R^2 \qquad (1)$$

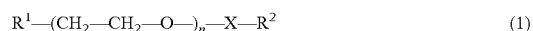

(wherein $R^1$ represents an aliphatic or aromatic hydrophobic group of a carbon number of 5 to 25, $R^2$ represents a polymer group having a polyamine structure or a polycarboxylic acid structure of a weight average molecular weight of 300 to 100,000, n represents an integer of 3 to 85, and X represents a group which is derived from a group capable of reacting with at least one kind of group selected from the group consisting of an amino group, an imino group and a carboxyl group, and is formed after the reaction, but it doesn't matter whether X is present or not) is used as the water-soluble surfactant, and a compound (B) having an epoxy group or an episulfide group is used as the water-soluble compound; and the shell is formed by reacting the compound (A) and the compound (B).

A second process according to the present invention for manufacturing a microcapsule for an electrophoretic display device comprises the following step of: causing a microcapsule to coexist with an ion-exchange resin in an aqueous medium wherein the microcapsule comprises an electrophoretic fine particle and a solvent both of which are encapsulated in a shell.

A sheet according to the present invention for an electrophoretic display device comprises: the above microcapsule according to the present invention for an electrophoretic display device; and a binder resin.

An electrophoretic display device according to the present invention is provided with a sheet for an electrophoretic display device, wherein the sheet comprises: the above microcapsule according to the present invention for an electrophoretic display device; and a binder resin.

In detail, the microcapsule according to the present invention for an electrophoretic display device can suppress reduction in later contrast even when the electrophoretic display device is allowed to stand under the high temperature and high humidity condition, particularly, under the high temperature and high humidity condition for a long time (e.g. under 60° C., 90% RH for 24 hours). A microcapsule for an electrophoretic display device, obtained by the first process according to the present invention for manufacturing a microcapsule for an electrophoretic display device, can suppress reduction in later contrast, particularly, even when the electrophoretic display device is allowed to stand under the high temperature and high humidity condition for a long time (e.g. under 60° C., 90% RH for 24 hours). On the other hand, a microcapsule for an electrophoretic display device, obtained by the second process according to the present invention for manufacturing a microcapsule for an electrophoretic display device, can suppress reduction in later contrast even when the electrophoretic display device is allowed to stand under the high temperature and high humidity condition.

C. Effects of the Invention

The present invention can provide: a microcapsule for an electrophoretic display device which can effectively suppress reduction in contrast later even when the electrophoretic display device is allowed to stand under the high temperature and high humidity condition, favorably, under the high temperature and high humidity condition for a long time (e.g. under 60° C., 90% RH for 24 hours); a process for manufacturing the same; and a sheet for an electrophoretic display device using the same.

These and other objects and advantages of the present invention will be more fully apparent from the following detailed disclosure.

DETAILED DESCRIPTION OF THE INVENTION

The present invention will be explained in detail below, but the scope of the present invention is not restricted by the explanation, and regarding embodiments other than those exemplified below, a variation can be appropriately performed in such a range that the gist of the present invention is not deteriorated.

[Microcapsule for Electrophoretic Display Device]:

The microcapsule according to the present invention for an electrophoretic display device (hereinafter, referred to as microcapsule according to the present invention) is, as mentioned above, a microcapsule comprising an electrophoretic fine particle and a solvent both of which are encapsulated in a shell (capsule shell, wall film), specifically, a microcapsule in which a liquid in which an electrophoretic fine particle is dispersed in a solvent (dispersion liquid) is encapsulated as a core substance in a shell, and it is important that an amount (concentration) of an alkaline metal ion comprising $Li^+$, $Na^+$, $K^+$, $Rb^+$, $Cs^+$ and $Fr^+$ is 150 ppm or smaller in the whole microcapsule. Thereby the reduction in later contrast can be suppressed even when the electrophoretic display device using the above microcapsule is allowed to stand under the high temperature and high humidity condition for a long time (e.g. under 60° C., 90% RH for 24 hours). The above amount of the alkaline metal ion is preferably 120 ppm or smaller, more preferably 100 ppm or smaller. When the amount of the alkaline metal ion exceeds 150 ppm, in the case where an electrophoretic display device using the microcapsule is allowed to stand under the high temperature and high humidity condition for a long time (e.g. under 60° C., 90% RH for 24 hours), there is a possibility that later contrast is remarkably reduced.

Inter alia, particularly, reduction in an amount of $Na^+$ (sodium ion) can further enhance contrast reduction suppressing effect, being preferable. Specifically, the amount in a shell is preferably 100 ppm or smaller, more preferably 80 ppm or smaller, further preferably 60 ppm or smaller, particularly preferably 50 ppm or smaller.

In addition, prior electrophoretic display devices in which TFT electrodes are used as display electrodes contacting with a microcapsule have had a problem that an ionic substance inhibits the actions of the TFT to thereby disable the proper control of the devices. However, if the above microcapsule according to the present invention, specifically, the microcapsule for an electrophoretic display device such that the amount of the alkaline metal ion (particularly that of the sodium ion) in the whole microcapsule is reduced, is used, then there can be an effect that even the above problem can be solved all at once.

Incidentally, in the present invention, the amount of the ion (that of the alkaline metal ion (including both of an amount of each of various alkaline metal ions and a total amount thereof)) in the whole microcapsule is a value measured by the method described in Example as described later.

A shell in the microcapsule according to the present invention is not limited but preferable examples include a shell formed from the hitherto publicly known shell raw material which can be used for manufacturing a microcapsule. However, a shell formed by carrying out particularly the below-mentioned "first process according to the present invention for manufacturing a microcapsule for an electrophoretic display device" is particularly preferable since a range of the aforementioned amount of an alkaline metal ion can be further easily satisfied. As the hitherto publicly known shell raw material, for example, when a coacervation method is used, a combination of a cationic compound such as a compound having an isoelectric point such as gelatin, and polyethylenimine, and an anionic substance such as gum arabic, carboxymethylcellulose, and styrene-maleic acid copolymer and polyacrylic acid is preferable. A melamine-formalin resin (melamine-formalin prepolymer) and a radical polymerizable monomer are preferable when an in-situ polymerization method is used. When an interface polymerization method is used, a combination of hydrophilic monomer such as polyamine, glycol and polyvalent phenol, and a hydrophobic monomer such as polybasic acid halide, bishaloformal and multivalent isocyanate is preferable, and a shell of polyamide epoxy resin, polyurethane and polyurea is formed.

A polyvalent amine can be further added to the shell raw material, and a microcapsule having a shell excellent in heat resistance retainability can be obtained. An amount of polyvalent amine to be used may be in such an extent that physical property of a desired shell due to a shell raw material is not extremely damaged. Preferable examples of the polyvalent amine include aliphatic amines such as ethylenediamine, diethylenetriamine, triethylenetetramine, tetraethylenepentamine, 1,3-propylenediamine, and hexamethylenediamine, epoxy compound adducts of aliphatic polyvalent amines such as poly(1-5)alkylene($C_2$ to $C_6$)polyamine-alkylene ($C_2$ to $C_{18}$) oxide adducts, aromatic polyvalent amines such as phenylenediamine, diaminonaphthalene, and xylylenediamine, alicyclic polyvalent amines such as piperazine, and heterocyclic diamines such as 3,9- bis-aminopropyl-2,4,8,10-tetraoxaspiro-[5.5]undecane. These may be used alone, or two or more kinds may be used jointly.

A dispersion liquid (a liquid in which an electrophoretic fine particle is dispersed in a solvent; this liquid may be referred to as dispersion liquid for an electrophoretic display device) encapsulated as the core substance in the shell will be explained below by recitation of specific examples.

Generally, as an electrophoretic display, there are methods of displaying by a contrast between a color of a solvent in a dispersion liquid and a color of an electrophoretic fine particle, and a method of displaying by a contrast between mutual colors of at least two kinds of electrophoretic fine particles in dispersion liquid.

A solvent used in dispersion liquid may be a solvent which has hitherto been used generally in a dispersion liquid for an electrophoretic display device, being not limiting. More particularly, the solvent is substantially insoluble in water (hydrophobic), and may be a solvent which does not interact with a formed shell to such an extent that function thereof is deteriorated. For example, a highly insulating organic solvent is preferable.

Preferable examples of a highly insulating organic solvent include aromatic hydrocarbons such as o-, m- or p-xylene, toluene, benzene, dodecylbenzene, hexylbenzene, phenylxylylethane and naphthene-based hydrocarbon, and aliphatic hydrocarbons such as cyclohexane, n-hexane, kerosene and paraffin-based hydrocarbons. Inter alia, long chain alkylbenzene such as dodecylbenzene and hexylbenzene, and phenylxylylethane is more preferable since a boiling point and a flash point are high, and there is little toxicity. These solvents may be used alone, or two or more kinds may be used jointly.

When a solvent is colored, it is preferable to color the solvent to such an extent that sufficient contrast is obtained relative to a color of an electrophoretic fine particle (e.g. white in the case of titanium oxide fine particle).

When a solvent is a colored one, a dye used in coloring is not particularly limited, but an oil-soluble dye is preferable and, particularly from a viewpoint of easy use, an azo dye and an anthraquinone dye are more preferable. Specifically, preferable examples of a yellow dye include azo compounds such as Oil Yellow 3G (manufactured by Orient Chemical Industries, Ltd.), preferable examples of an orange dye include azo compounds such as Fast Orange G (manufactured by BASF), preferable examples of a blue dye include anthraquinones such as Macrolex blue RR (manufacture by Bayer A.G.), preferable examples of a green dye include anthraquinones such as Sumiplast green G (manufactured by Sumitomo Chemical Co., Ltd.), preferable examples of a brown dye include azo compounds such as Oil Brown GR (manufactured by Orient Chemical Industries, Ltd.), preferable examples of a red dye include azo compounds such as Oil Red 5303 (manufactured by Arimoto Chemical Co., Ltd.) and Oil Red SB (manufactured by Orient Chemical Industries, Ltd.), preferable examples of a purple dye include anthraquinones such as Oil Violet #730 (manufactured by Orient Chemical Industries, Ltd.), and preferable examples of a black dye include azo compounds such as Sudan Black X60 (manufactured by BASF), and a mixture of anthraquinone-based Macrolexblue FR (manufactured by Bayer A.G.) and azo-based Oil Red XO (manufactured by Kanto Chemical Co., Inc.). These dyes may be used alone or two or more kinds may be used jointly.

The electrophoretic fine particle used in the dispersion liquid is not limited as far as it is an electrophoresing pigment particle, that is, a colored particle exhibiting positive or negative polarity, being not limiting. Specifically, white particles such as titanium oxide, and black particles such as carbon black and titanium black are preferable, or other particles as described later may be used. These may be used alone, or two or more of them may be used jointly.

When a titanium oxide fine particle is used, the kind of titanium oxide is not limited, but titanium oxide which is generally used as a white pigment may be used. Titanium oxide may be rutile-type or anatase-type. When fading of a coloring agent due to photoactive ability of titanium oxide is considered, rutile-type having low photoactive ability is preferable, and titanium oxide which was Si-treated, Al-treated, Si—Al-treated or Zn—Al-treated for the purpose of further reducing photoactive ability is more preferable.

As an electrophoretic fine particle, particles other than the aforementioned titanium oxide fine particle, carbon black and titanium black may be used jointly, or other particles may be used in place of titanium oxide. It is preferable that other particles are a pigment particle like a titanium oxide fine particle. In addition, other particles are not necessarily required to have electrophoresing property like a titanium oxide fine particle. If necessary, electrophoresing property may be imparted by some hitherto publicly known method.

The above other particles are not limited, but preferable examples of white particles include inorganic pigments such as barium sulfate, zinc oxide and zinc white in addition to the aforementioned titanium oxide; preferable examples of yellow particles include inorganic pigments such as yellow iron oxide, cadmium yellow, titanium yellow, chromium yellow and chrome yellow, insoluble azo compounds such as fast yellow, fused azo compounds such as chromophthal yellow, azo complex salts such as benzimidazoloneazoyellow, fused polycycles such as fravans yellow, organic pigments such as Hansa yellow, naphthol yellow, nitro compound and pigment yellow; preferable examples of orange particles include inorganic pigments such as molybdate orange, and organic pigments such as azo complex salts such as benzimidazolone azo orange and fused polycycles such as pemone orange; preferable examples of red particles include inorganic pigments such as red iron oxide and cadmium red, and organic pigments such as dyeing lakes such as mada lake, soluble azo compounds such as lake red, insoluble azo compounds such as naphthol red, fused azo compounds such as chromophthal scared, fused polycycles such as thioindigo Bordeaux, quinacridone pigments such as sinkasha red Y and hostapaim red, and azo pigments such as permanent red and fast slow red; preferable examples of purple particles include inorganic pigments such as manganese violet, and organic pigments such as dyeing lakes such as rhodamine lake, and fused polycycles such as dioxazine violet; preferable examples of blue particles include inorganic pigments such as Prussian blue, ultramarine, cobalt blue and cerulean blue, and organic pigments such as phthalocyanines such as phthalocyanines blue, indanthrenes such as indanthrenes blue, alkali blue; preferable examples of green particles such as inorganic pigments such as emerald green, chrome green, chromium oxide and pyridian, and organic pigments such as azo complex salts such a nickel azo yellow, nitroso compounds such as pigment green and naphthol green, and phthalocyanines such as phthalocyanine green; preferable examples of black particles include inorganic pigments such as iron black, and organic pigments such as aniline black in addition to the aforementioned carbon black and titanium black. These may be used alone, or two more kinds may be used jointly.

A particle diameter of an electrophoretic fine particle is not limited, but is preferably 0.1 to 5 μm, more preferably 0.2 to 3 µm as expressed by a volume average particle diameter. When a particle diameter (volume average particle diameter) is less than 0.1 µm, sufficient opacifying property is not obtained in a display part in an electrophoretic display device, and a coloring degree is reduced, and there is a possibility that an electrophoretic display device having high contrast property is not obtained. When the particle diameter exceeds 5 µm, it becomes necessary to increase a coloring degree of a particle itself higher than a necessary degree (increase in a pigment concentration), and there is a possibility that smooth electrophoretic property of a fine particle is reduced.

The dispersion liquid may contain other components if necessary in addition to the aforementioned solvents and electrophoretic fine particle, and the kind thereof is not limited. Examples of other components include a dispersant. The dispersant may be contained before an electrophoretic fine particle is dispersed into a solvent, or may be contained after a particle is dispersed, being not limited.

The dispersant is not generally limited as far as it is the hitherto publicly known dispersant which can assists the dispersing of a particle into a solvent. Preferable examples include anionic surfactants, cationic surfactants, amphoteric surfactants, nonionic surfactants, fluorine-based surfactants, sorbitan fatty acid ester surfactants such as sorbitan sesquioleate, dispersants such as block-type polymers and graft-type polymers, and various coupling agents, which is soluble in the dispersion liquid. These may be used alone or two or more kinds may be used jointly. Among the aforementioned dispersants, coupling agents are more preferable since dispersion stability becomes better when a charge is applied. When a fine particle is treated with a coupling agent, a covering layer of a coupling agent is formed on a fine particle surface.

Preferable examples of the coupling agent include (i) silane coupling agents, (ii) titanate-based coupling agents, (iii) aluminum-based coupling agents, (iv) coupling agents having a vinyl group, (v) coupling agents having at least one group selected from an amino group, a quaternary ammonium salt, a carboxyl group and a phosphate group (vi) coupling agents having an amino group or a glycidyl group at an end, and (vii) organodisilazane. More preferable are titanate coupling agents and aluminum-based coupling agents, and further preferable are the aforementioned various coupling agents which also have a long chain alkyl group, and particularly preferable are titanate coupling agents which is also have a long chain alkyl group and aluminum-based coupling agents which also have a long chain alkyl group. The aforementioned coupling agents may be used alone, or two or more kinds may be used jointly.

The reason why a coupling agent having a long chain alkyl group is preferable as described above is that since a long chain alkylbenzene and the like which are a solvent having high safety enhance affinity, the effect of enhancing dispersion stability of an electrophoretic fine particle is high.

A method of dispersing an electrophoretic fine particle into a solvent when the dispersion liquid is prepared may be usually the known dispersing method, being not limiting. Preferable examples include: a method including the following steps of charging such as an electrophoretic fine particle, a solvent and a coupling agent which are raw material components into an ultrasonic bath and then ultrasonically dispersing them under stirring; a method including the following step of dispersing the fine particle using an instrument having dispersing ability such as a paint shaker, a ball mill and a sand grinding mill; a dry method including the following step of spraying a coupling agent with the dry air or nitrogen gas while forcedly stirring a solvent and a fine particle with such as a V blender; a wet method including the following steps of appropriately dispersing a fine particle into a solvent to obtain a slurry and then adding a coupling agent; and a spraying method including the following step of spraying a coupling agent while vigorously stirring a solvent and a fine particle which have been pre-warmed.

A shape of the microcapsule according to the present invention is not limited, but is preferably a particulate-like such as a pearl-like.

A particle diameter (volume average particle diameter) of the microcapsule according to the present invention is not limited, but is preferably 5 to 300 µm, more preferably 10 to 200 µm, further preferably 15 to 150 µm. When a particle diameter of the microcapsule is less than 5 µm, there is a possibility that a sufficient display concentration is not obtained at a displaying part when the microcapsule is used in an electrophoretic display device. When the particle diameter exceeds 300 µm, there is a possibility that a problem arises in a mechanical strength of the microcapsule itself and, additionally, when the microcapsule is used in an electrophoretic display device, there is a possibility that electrophoretic property of a titanium oxide fine particle in a dispersion liquid encapsulated in the microcapsule is not sufficiently exerted, and a starting voltage for display becomes high.

A variation coefficient of a particle diameter (volume average particle diameter) of the microcapsule according to the present invention is preferably 30% or smaller, more preferably 25% or smaller, further preferably 20% or smaller. When the variation coefficient exceeds 30%, there is a possibility that an existing rate of those having an effective particle diameter as microcapsule for electrophoretic display device is reduced, and it becomes necessary to use many microcapsules.

A particle diameter of the microcapsule according to the present invention and a variation coefficient (i.e. narrowness of a particle size distribution) thereof greatly depend on a particle diameter and a particle size distribution of a dispersion liquid in which a particle is dispersed is an aqueous medium at preparation. Therefore, by performing preparation by appropriately controlling the dispersing conditions, a microcapsule having a desired particle diameter and its variation coefficient can be obtained.

A thickness of a shell in the microcapsule according to the present invention is not limited, but in the wet state, it is preferably 0.1 to 5 µm, more preferably 0.1 to 4 µm, further preferably 0.1 to 3 µm. When a thickness of a shell is less than 0.1 µm, there is a possibility that a sufficient strength as a shell is not obtained. When the thickness exceeds 5 µm, transparency is reduced, resulting in a cause for reduction in contrast. Additionally, there is a possibility that flexibility of a microcapsule itself is reduced, and adherability to an electrode film becomes insufficient.

As a process for manufacturing the microcapsule according to the present invention, the below-mentioned "first process according to the present invention for manufacturing a microcapsule for an electrophoretic display device" is particularly preferable in that a microcapsule for an electrophoretic display device having the aforementioned characteristics can be easily obtained. In addition, a process for manufacturing the microcapsule according to the present invention is not limited to this, but the hitherto publicly known process comprising a microcapsulating step, for example, a process using a so-called interface sedimentation method such as a coacervation method (phase separation method), an in-liquid drying method, a melting degradation cooling method, a spray drying method, a pan coating method, an in-air suspension covering method and a powder bed method, or a so-called interface reaction method such as an interface polymerization method, an in-situ polymerization method, an in-liquid curing film (covering) method (orifice method) and an interface reaction method (inorganic chemical reaction method) can also be preferably adopted. In this case, for example, it is preferable that there is adopted the below-mentioned "second process according to the present invention for manufacturing a microcapsule for an electrophoretic display device", specifically, that: there is involved a step (A) of causing a microcapsule for an electrophoretic display device (wherein the microcapsule is obtained via a microcapsulating step and is a microcapsule in which an electrophoretic fine particle and a solvent are encapsulated in a shell) to coexist with an ion-exchange resin in an aqueous medium, whereby the ionic substance is removed (desalted), that is, the ion amount (alkaline metal ion amount) is reduced.

The microcapsule according to the present invention is a microcapsule for an electrophoretic display device, and can be used in all of various display devices in which an electrophoretic display device can be utilized and applied. Examples include, in addition to the normal electrophoretic display panel, a flexible display device which is thin like a paper and a free bended, a display device which can be easily converted into a large area and is inexpensive, a so-called digital paper (electron paper) such as a paper-like display and a rewritable paper, a display device such as an IC card and an IC tag, an electronic white board, a guideline plate, an advertising plate, an electronic paper, an electronic book and a portable terminal (e.g. PDA).

[Process for Manufacturing Microcapsule for Electrophoretic Display Device]:

(First Process for Manufacturing Microcapsule for Electrophoretic Display Device):

As to the first process according to the present invention for manufacturing a microcapsule for an electrophoretic display device (hereinafter, referred to as first manufacturing process according to the present invention), it is important that: as described above, when a shell is formed on a surface of a core substance by dispersing a core substance (which is a liquid containing a hydrophobic solvent and an electrophoretic fine particle (specifically, a liquid (hydrophobic dispersion liquid) in which the electrophoretic fine particle is dispersed in the hydrophobic solvent)) into an aqueous medium containing a water-soluble surfactant and thereafter adding a water-soluble compound to the aqueous medium, then the aforementioned compound (A) is used as the water-soluble surfactant, and the aforementioned compound (B) is used as the water-soluble compound, and the shell is formed by reacting these compounds (A) and (B). That is, in the first manufacturing process according to the present invention, not only the compound (B) which is the water-soluble compound, but also the compound (A) which is the water-soluble surfactant is a raw material compound for the shell.

It can be said that the first manufacturing process according to the present invention is a process for manufacturing a microcapsule for an electrophoretic display device which is classified in a so-called coacervation method (phase separation method).

A general process for manufacturing a microcapsule for an electrophoretic display device for carrying out the first manufacturing process according to the present invention will be explained, and characteristic of the first manufacturing process according to the present invention will be explained in detail below. In the practice of the present invention, as techniques and conditions other than those shown below, techniques and conditions which can be usually adopted in a process for manufacturing a microcapsule for an electrophoretic display device according to the aforementioned coacervation method can be appropriately used.

In the first manufacturing process according to the present invention, first, a hydrophobic dispersion liquid as a core substance (which is to be a core substance) is dispersed into an aqueous medium containing a particular water-soluble surfactant.

The aqueous medium which can be used in the first manufacturing process according to the present invention is not limited, but, for example, water or a mixture of a hydrophilic organic solvent and water can be used. When the hydrophilic organic solvent and water are used jointly, the ratio of blending water is preferably 95 to 70% by weight, more preferably 95 to 80% by weight.

The hydrophilic organic solvent is not limited, but preferable examples include alcohols such as methanol, ethanol, isopropyl alcohol, n-propyl alcohol and allyl alcohol; glycols such as ethylene glycol, propylene glycol, butylene glycol, hexylene glycol, pentanediol, hexanediol, heptanediol, and dipropylene glycol, ketones such as acetone, methyl ethyl ketone, and methyl propyl ketone; esters such as methyl formate, ethyl formate, methyl acetate, and methyl acetoacetate; ethers such as diethylene glycol monomethyl ether, diethylene glycol monoethyl ether, diethylene glycol dimethyl ether, ethylene glycol monomethyl ether, ethylene glycol monoethyl ether, and dipropylene glycol monomethyl ether. These may be used alone, or two or more kinds may be used jointly.

In the first manufacturing process according to the present invention, the aqueous medium may be used with other solvent in addition to the aforementioned water and hydrophilic organic solvent. Examples of other solvent include hexane, cyclopentane, pentane, isopentane, octane, benzene, toluene, xylene, ethylbenzene, aminylsqualene, petroleum ether, terpene, castol oil, soybean oil, paraffin and keronine. When other solvent is used jointly, its use amount is preferably 30% by weight or smaller, more preferably 25% by weight or smaller, further preferably 20% by weight or smaller relative to the aforementioned aqueous medium comprising a hydrophilic organic solvent and water.

A hydrophobic dispersion liquid which can be used in the first manufacturing process according to the present invention is not limited, but explanation for the "dispersion liquid" in the microcapsule according to the present invention can be applied similarly.

In the first manufacturing process according to the present invention, an amount of a hydrophobic dispersion liquid as a core substance to be dispersed into an aqueous medium is not limited, but is preferably 5 to 70 parts by weight, more preferably 10 to 65 parts by weight relative to 100 parts by weight of an aqueous medium. When the amount is less than 5 parts by weight, since a concentration is low, a reaction of a compound (A) and a compound (B) takes a long time, and there is a possibility that an objective shell is not formed, and a microcapsule having a wide particle diameter distribution is obtained, leading to reduction in productivity. On the other hand, when the amount exceeds 70 parts by weight, there is a possibility that liquid droplets of a hydrophobic dispersion liquid are aggregated or fused (unified), and a reverse suspension is formed, and a microcapsule can not be manufactured.

In the first manufacturing process according to the present invention, as described above, the compound (A) represented by the following general formula (1):

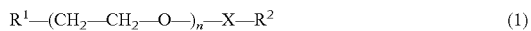

(wherein $R^1$ represents an aliphatic or aromatic hydrophobic group of a carbon number of 5 to 25, $R^2$ represents a polymer group having a polyamine structure or a polycarboxylic acid structure of a weight average molecular weight of 300 to 100,000, n represents an integer of 3 to 85, and X represents a group which is derived from a group capable of reacting with at least one kind of group selected from the group consisting of an amino group, an imino group and a carboxyl group, and is formed after the reaction, but it doesn't matter whether X is present or not)

is used as the aforementioned particular water-soluble surfactant. By using the compound (A), the aforementioned object of the present invention can be easily attained.

In the general formula (1), $R^1$ represents an aliphatic or aromatic hydrophobic group of a carbon number of 5 to 25, and examples include aliphatic hydrocarbon groups such as a pentyl group, a hexyl group, a heptyl group, an octyl group, a decyl group, a dodecyl group, an octadecyl group and a behenyl group, and aromatic hydrocarbon groups such as a phenyl group, a benzyl group, a tolyl group, a xylyl group, a biphenyl group, a p-terphenyl group, an indenyl group, a naphthyl group and an indenyl-naphthyl group, being not limiting.

A carbon number of the hydrophobic group represented by $R^1$ is 5 to 25, preferably 5 to 18. When the carbon number is less than 5, there is a possibility that a compound (A) does not manifest sufficient surface active ability. When the carbon number exceeds 25, hydrophobicity becomes too high, and there is a possibility that solubility of a compound (A) in water is reduced.

In the general formula (1), the "—$CH_2$—$CH_2$—O—$)_n$" is a polymer group having a polyether structure (polyethylene oxide structure), and it is important that the number n of its structural units "$CH_2$—$CH_2$—O—" is 3 to 85. Hereupon, the n is preferably 5 to 60, more preferably 5 to 50. When the n is less than 3, there is a possibility that solubility in an aqueous medium is not sufficiently exerted, resulting in water-insolubility and, when the n exceeds 85, solubility in an aqueous medium becomes too high, and there is a possibility that, even when reacted with a compound (B), the compound is not precipitated as an insoluble, and a shell is not sufficiently formed, depending on balance between a hydrophobic group.

In the general formula (1), X represents a group which is derived from a group capable of reacting (binding reaction) with at least one kind of group selected from the group consisting of an amino group, an imino group and a carboxyl group, and is formed after the reaction (binding reaction), but it doesn't matter whether X is present or not in the general formula (1). Herein, the amino group, imino group, and carboxyl group, more particularly, refer to an amino group and an imino group which can be present in a polymer having a polyamine structure, as well as a carboxyl group which can be present in a polymer having a polycarboxylic acid structure. Examples of a group capable of reacting with at least one kind of group selected from the group consisting of these groups include a group represented by $X^2$ in the following general formula (3). As the group represented by X, specifically, there can be exemplified "—$CH_2$—$CH_2$—S—" derived from a group represented by the following structural formula (b), "—NH—CO—" derived from an isocyanate group, "—CO—NH—$CH_2$—$CH_2$—" derived from an oxazoline group, "—CH(OH)—" derived from an aldehyde group "—CO—" derived from a carboxyl group, "—NH—" derived from an amino group, and "=N—" derived from an imino group.

In the general formula (1), $R^2$ represents a polymer group having a polyamine structure or a polycarboxylic acid structure of a weight average molecular weight of 300 to 100,000, and the weight average molecular weight is preferably 300 to 50,000. When the weight average molecular weight is less than 300, there is a possibility that insolubles are precipitated slowly even when reacted with a compound (B), and formation of a shell takes a long time, and a shell having a high strength is not obtained. When the molecular weight exceeds 100,000, there is a possibility that, by a reaction with a compound (B), a viscosity of the whole reaction system is rapidly increased, and stirring becomes difficult. In addition, when forcibly stirred, it becomes difficult to control a liquid droplet particle diameter of hydrophobic dispersion liquid, for example, there is a possibility that a particle diameter becomes too small.

The polymer group having a polyamine structure is not limited, but examples include a polymer group having a polyamine structure containing a primary amino group and/or a secondary amino group, for example, a polymer group having at least one kind of group selected from the group consisting of polyethylenimine, polyamine, polyether amine, polyvinylamine, modified polyvinylamine, polyalkylamine, polyamide, polyamineepichlorohydrin, poly(dialkylaminoalkyl vinyl ether), poly(dialkylaminoalkyl (meth)acrylate), polyallylamine, polyethylenimine-grafted polyamidoamine and protonated polyamidoamine.

Examples of the polymer group having a polycarboxylic acid structure is not limited, but examples include a polymer group having a water-soluble polycarboxylic acid structure obtained by polymerizing a monomer component containing 30 mol % or more of unsaturated carboxylic acid such as acrylic acid, methacrylic acid, α-hydroxyacrylic acid, crotonic acid, phthalic acid, maleic acid, fumaric acid, itaconic acid, citraconic acid, aconitic acid and vinyl acetate.

A process for preparing a compound (A) represented by the general formula (1) is not limited, but a method of obtaining a compound (A) by adding dropwise a compound represented by the following general formula (2) or the following general formula (3) to an aqueous solution of polyamine or polycarboxylic acid under stirring to react them is preferable.

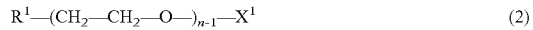

(wherein $X^1$ represents a group represented by the following structural formula (a):

(wherein $X^2$ represents any one kind selected from the group consisting of a group represented by the following structural formula (b):

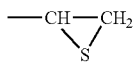
(b)

an isocyanate group, an oxazoline group, an aldehyde group, a carboxyl group, an amino group and an imino group, that is, $X^2$ represents a group capable of reacting (binding reaction) with at least one kind of group selected from the group consisting of an amino group, an imino group and a carboxyl group)

When the compound represented by the general formula (2) is used upon preparation of a compound (A), a group represented by X is not present in the general formula (1). On the other hand, when the compound represented by the general formula (3) is used, a group represented by the X is present in the general formula (1).

A reaction temperature upon the reaction is not limited, but is preferably 10 to 90° C., more preferably 15 to 80° C. when polyamine is used, and is preferably 20 to 100° C., more preferably 20 to 90° C. when polycarboxylic acid is used. A reaction time is not limited, but is preferably 0.5 to 5 hours, more preferably 1 to 5 hours.

In the first manufacturing process according to the present invention, a compound (A) used as a water-soluble surfactant may be dissolved into an aqueous medium before hydrophobic dispersion liquid is dispersed into the aqueous medium, or may be dissolved at the same time as the dispersing or after dispersed, being not limiting.

In the first manufacturing process according to the present invention, a ratio of blending a compound (A) is preferably 1 to 30% by weight, more preferably 3 to 25% by weight, further preferably 5 to 25% by weight relative to a hydrophobic dispersion liquid to be dispersed into an aqueous medium. When the ratio of blending a compound (A) is less than 1% by weight, there is a possibility that the dispersed state of a hydrophobic dispersion liquid can not be sufficiently stably retained, and liquid droplets of a hydrophobic dispersion liquid are aggregated or fused (unified). On the other hand, when the ratio exceeds 30% by weight, there is a possibility that a viscosity of the whole reaction system is rapidly increased due to a reaction with a compound (B), and stirring becomes difficult, and there is a possibility that when forcibly stirred, control of a liquid droplet particle diameter of a hydrophobic dispersion liquid becomes difficult and, for example, the diameter becomes too small.

In the first manufacturing process according to the present invention, a method of dispersing a hydrophobic dispersion liquid into an aqueous medium is not limited, but the known dispersing method may be usually adopted. Preferable examples include a method of dispersing a mixture containing an aqueous medium, a hydrophobic dispersion liquid and a water-soluble surfactant by mechanically vigorously stirring the mixture using a disperser, a homomixer (manufactured by Tokushu Kika Kogyo Co., Ltd.) or a homogenizer (manufactured by Nihonseiki Kaisha Ltd.); a method of dispersing the aforementioned mixture by passing through an in-static-tube mixer (Noritake Static Mixer (manufactured by Noritake Company Limited)), a throughzer mixer (manufactured by Sumitomo Heavy Machine Industries, Ltd.), a Sakea mixer (manufactured by Sakura Seisakusho CO., Ltd.) or a TK•ROSS•LPD mixer (manufactured by Tokushu Kika Kogyo Co., Ltd.); a method of dispersing a hydrophobic dispersion liquid into an aqueous medium containing a water-soluble surfactant by passing through a regulated pore such as a SPG membrane (silus porous glass) and a microchannel emulsification device (manufactured by EP Teck).

In the first manufacturing process according to the present invention, a shell is formed on a surface of a liquid droplet of a hydrophobic dispersion liquid by adding a particular water-soluble compound to an aqueous medium after a hydrophobic dispersion liquid is dispersed.

As the particular water-soluble compound, a compound (B) having an epoxy group or an episulfide group is used. By combining the aforementioned compound (A) and compound (B), the aforementioned object of present invention can be easily attained. Preferable examples of an epoxy group in the compound (B) include a compound represented by the structural formula (a) and a group represented by the following structural formula (c):

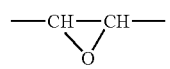
(c)

and preferable examples of an episulfide group in a compound (B) include a group represented by the structural formula (b) and a group represented by the following structural formula (d):

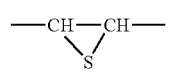
(d)

The compound (B) having an epoxy group is not limited, but a water-soluble epoxy compound having two or more epoxy groups in one molecule is preferable, and examples include sorbitol polyglycidyl ester, sorbitan polyglycidyl ester, (poly)glycerol polyglycidyl ester, pentaerythritol polyglycidyl ester, triglycidyltris(2-hydroxyethyl) isocyanurate, trimethylolpropane polyglycidyl ester, neopentyl glycol diglycidyl ester, ethylene, polyethylene glycol diglycidyl ester, propylene, polypropylene glycol diglycidyl ester and adipic acid diglycidyl ester. These may be used alone, or two or more kinds may be used jointly.

The compound (B) having an episulfide group is not limited, but a water-soluble episulfide compound having two or more episulfide groups in one molecule is preferable, and examples include sorbitol polythioglycidyl ester, (poly)glycerol polythioglycidyl ester, tristhioglycidyltris(2-hydroxyethyl) isocyanurate, propylene glycol dithioglycidyl ester, polypropylene glycol dithioglycidyl ester and adipic acid dithioglycidyl ester. These may be used alone, or two or more kinds may be used jointly.

Solubility of the compound (B) in water is preferably 30% by weight or larger, more preferably 40% by weight or larger, further preferably 50% by weight or larger. When solubility of the compound (B) in water satisfies the aforementioned range, a reaction with a compound (A) is performed uniformly and rapidly, a shell is formed uniformly and rapidly, and excellent effect of better controllability of a thickness and a strength of a shell is obtained. On the other hand, when the solubility is smaller than 30% by weight, a reaction with a compound (A) becomes non-uniform, and there is a possibility that a shell is formed non-uniformly. In the present invention, solubility of the compound (B) in water is a value obtained by the method described in Example later.

A weight average molecular weight of the compound (B) is preferably 300 to 100,000, more preferably 300 to 75,000, further preferably 300 to 50,000. When a weight average molecular weight of the compound (B) satisfies the aforementioned range, excellent effect such as easy control of a thickness and a strength of a shell is obtained. When the weight average molecular weight is less than 300, it is difficult to obtain a shell having a sufficient strength, and it becomes difficult to control reactivity with the compound (A), and there is a possibility that it becomes difficult to form a uniform shell. On the other hand, when the weight average molecular weight exceeds 100,000, a viscosity of the whole reaction system is rapidly increased due to a reaction with the compound (A), and there is a possibility that stirring becomes difficult, and when forcibly stirred, there is a possibility that control of a particle diameter of a liquid droplet of a hydrophobic dispersion liquid becomes difficult, for example, the diameter becomes too small.

An amount of the compound (B) to be added is not limited, but is preferably 0.1 to 10 parts by weight, more preferably 0.5 to 5 parts by weight, further preferably 0.5 to 3 parts by weight relative to 1 part by weight of the compound (A). By adjusting an amount of the compound (B) to be added, a thickness of a formed shell can be easily controlled. When an amount of the compound (B) to be added is less than 0.1 part by weight, there is a possibility that a sufficient amount of a shell cannot be formed and, when the amount exceeds 10 parts by weight, there is a possibility that a great deviation occurs in a component composition of a shell, and a strength of a shell is reduced.

A method of adding the compound (B) to an aqueous medium is not limited, but may be added at once, or may be added sequentially (continuous addition and/or intermittent addition).

In the first manufacturing process according to the present invention, by reacting the added compound (B) and the aforementioned compound (A), a shell is formed on a surface of a liquid droplet of a hydrophobic dispersion liquid. Specifically, an epoxy group of the compound (B) and a polyamine part (amino group, imino group etc.) or a polycarboxylic acid part (carboxyl group etc.) of the compound (A) are reacted together, whereby the insoluble reaction product derived from the compound (A) and the compound (B) is caused to make sedimentation on a liquid droplet surface of a hydrophobic dispersion liquid to obtain a shell.

A temperature for reacting the compound (A) and the compound (B) is not limited, but when a compound in which $R^2$ of the general formula (1) is a polymer group having a polyamine structure is used as the compound (A), the temperature is preferably 25 to 75° C., more preferably 30 to 75° C. and, when a compound in which $R^2$ of the general formula (1) is a polymer group having a polycarboxylic acid structure is used as the compound (A), the temperature is preferably 40 to 95° C., more preferably 45 to 90° C. In addition, a reaction time is not limited, but is preferably 3 to 24 hours, more preferably 3 to 12 hours.

In the reaction between the compound (A) and the compound (B), an aging term may be further provided. A temperature at the aging is not limited, but is preferably the same temperature as the aforementioned reaction temperature, and an aging time is not limited, but is preferably 1 to 5 hours, more preferably 1 to 3 hours.

In the first manufacturing process according to the present invention, in addition to the compound (B), a crosslinking agent may be added to an aqueous medium after a hydrophobic dispersion liquid has been dispersed. By further adding a crosslinking agent and using it, a strength of a formed shell can be enhanced more, disintegration and damage of a shell in an isolating step and a washing step after microcapsulation can be effectively suppressed. Timing of addition of the crosslinking agent may be before the compound (A) and the compound (B) are reacted, such as addition with the compound (B), or may be during or after the reaction between the compound (A) and the compound (B), being not limiting.

The crosslinking agent is not limited, but examples include sodium diethyldithiocarbamate, diethylammonium diethyldithiocarbamate, dithiooxalic acid and dithiocarbonic acid. These may be used alone, or two or more kinds may be used jointly. An amount of the crosslinking agent to be used is not limited, but is preferably 0.1 to 30 parts by weight, more preferably 0.3 to 20 parts by weight, further preferably 0.5 to 15 parts by weight relative to 100 parts by weight of the compound (B). When an amount of the crosslinking agent to be used is less than 0.1 part by weight, formation of a shell takes a long time, and there is a possibility that control of a thickness and a strength of a shell becomes difficult. When the amount exceeds 30 parts by weight, a reaction with an epoxy group or an episulfide group in the compound (B) becomes excessive, and there is a possibility that the reaction between the compound (A) and the compound (B) is disordered.

In the first manufacturing process according to the present invention, as described above, by microcapsulation in which a shell is formed on a liquid droplet surface of a hydrophobic dispersion liquid due to a reaction between the compound (A) and the compound (B), a prepared solution containing a microcapsule for an electrophoretic display device and an aqueous medium is obtained.

In the first manufacturing process according to the present invention, if necessary, a compound (A) is further added, and a compound (B) is further added to the prepared solution of a microcapsule for an electrophoretic display device, and the similar reaction to that described above may be performed. By doing this, a shell can be further formed on a once formed shell and, as a result, a microcapsule for an electrophoretic display device in which a shell composed of plural layers is formed is obtained. The microcapsule for an electrophoretic display device in which a shell composed of plural layers is formed can, for example, further improve physical properties which are obtained by a monolayered shell, and can also manifest physical properties which are different between an inner side and an outer side of a shell. Specifically, the effect that physical properties such as tackiness, high hydrophilicity and softness can be easily introduced while original performance of a shell is possessed is obtained.

In the first manufacturing process according to the present invention, after a microcapsule for an electrophoretic display device is manufactured by a step of microcapsulation by the aforementioned reaction of the compound (A) and the compound (B), if necessary, the microcapsule may be isolated. For example, after manufacturing of a microcapsule for an electrophoretic display device, the microcapsule can be separated and isolated from an aqueous medium by suction filtration or natural filtration.

After isolation, the microcapsule may be classified in order to obtain a microcapsule for an electrophoretic display device having a narrower particle size distribution.

As the classification, for example, it is preferable to adopt a wet classification format (wet classification). The wet classification is a format of performing classification of a microcapsule for an electrophoretic display device on a prepared solution obtained by microcapsulation. Since classification is performed on the prepared solution, classification becomes wet classification. More particularly, the format is a format of classification-treating the prepared solution as it is or after dilution with an arbitrary aqueous medium, to obtain a desired particle diameter and particle size distribution of a microcapsule for an electrophoretic display device in a prepared solution. Wet classification can be performed, for example, by a method or an apparatus using a format such as a sieving format (filter format), a centrifugation settlement format and a natural settlement format. A sieving format can be effectively used on a microcapsule for an electrophoretic display device having a relatively great particle diameter.

In addition, it is also preferable to perform a procedure of washing the resulting microcapsule for an electrophoretic display device in order to remove impurities and improve product quality.

The microcapsule for an electrophoretic display device, obtained by the first manufacturing process according to the present invention, can suppress reduction in later contrast even when the electrophoretic display device using this microcapsule is allowed to stand under the high temperature and high humidity condition for a long time (e.g. under 60° C., 90% RH for 24 hours). As to such as its physical properties (e.g. alkaline metal ion amount, particle diameter (volume average particle diameter), variation coefficient of particle diameter (volume average particle diameter), thickness of shell, uses), thereto the aforementioned explanations about the microcapsule according to the present invention can be applied in the same way.

(Second Process for Manufacturing Microcapsule for Electrophoretic Display Device):

The second process according to the present invention for manufacturing a microcapsule for an electrophoretic display device (hereinafter referred to as second manufacturing process according to the present invention) is, as aforementioned, a process comprising the step (A), as the essential step, of causing a microcapsule for an electrophoretic display device to coexist with an ion-exchange resin in an aqueous medium wherein the microcapsule comprises an electrophoretic fine particle and a solvent both of which are encapsulated in a shell. In detail, the above step (A) is a step of causing a microcapsule for an electrophoretic display device (wherein the microcapsule is obtained via the step of microcapsulating a dispersion liquid (to be a core substance) for an electrophoretic display device) to coexist with an ion-exchange resin in an aqueous medium.

The second manufacturing process according to the present invention has no limitation other than comprising the above step (A) as the essential step, and thereto there can be applied all methods (e.g. various means and various conditions) for manufacturing a microcapsule for an electrophoretic display device involving the microcapsulating step. For example, there can also be applied all of hitherto publicly known manufacturing methods such as: a manufacturing method using a so-called interface sedimentation method such as a coacervation method (phase separation method), an in-liquid drying method, a melting degradation cooling method, a spray drying method, a pan coating method, an in-air suspension covering method and a powder bed method; and a manufacturing method using a so-called interface reaction method such as an interface polymerization method, an in-situ polymerization method, an in-liquid curing film (covering) method (orifice method) and an interface reaction method (inorganic chemical reaction method). Of course, in the second manufacturing process according to the present invention, there can also be a mode in which the aforementioned first manufacturing process according to the present invention is applied. Such a mode can be said to be a mode which is the most favorable for attaining the object of the present invention.

In the second manufacturing process according to the present invention, there is no limitation on the shell raw materials usable in the microcapsulating step. Hitherto publicly known shell raw materials usable for manufacturing a microcapsule can be used, and thereto the aforementioned explanations about the "shell raw materials" for the microcapsule according to the present invention can be applied in the same way.

In the second manufacturing process according to the present invention, there is no limitation on the dispersion liquid (liquid in which an electrophoretic fine particle is dispersed in a solvent, that is, dispersion liquid for an electrophoretic display device) which is used as a core substance to be encapsulated in a shell in the microcapsulating step in the aforementioned various manufacturing methods. Specifically, thereto the aforementioned explanations about the "dispersion liquid" for the microcapsule according to the present invention can be applied in the same way.

Hereinafter, as an example of the methods for manufacturing a microcapsule for an electrophoretic display device involving the microcapsulating step, a brief explanation is given about a manufacturing method by the coacervation method in which gelatin and gum arabic are used as shell raw materials.

In this manufacturing method, generally, shell raw materials including gelatin and gum arabic are added into an aqueous medium and then dissolved therein by raising the temperature, and then the dispersion liquid (to be a core substance) for an electrophoretic display device is added under stirring to form dispersion liquid droplets. Next, a dilute aqueous acid solution is added to the resultant dispersion liquid to decrease the pH to 4, and then the resultant dispersion liquid is cooled to deposit shells on surfaces of the above liquid droplets. The deposited shells are hardened with a crosslinking agent, and then an alkaline aqueous solution is added to the resultant dispersion liquid to increase the pH to 9, and then the temperature of the resultant dispersion liquid is returned to normal temperature, thus obtaining microcapsules. As to such as other various specific conditions, there can appropriately be adopted such as publicly known conditions. However, as to the below-mentioned matters such as conditions, it is also possible to favorably adopt them.

The amount in which the dispersion liquid for an electrophoretic display device is added into the aqueous medium is not limited. However, this addition amount is preferably 20 to 200 parts by weight, more preferably 130 to 150 parts by weight, relative to 100 parts by weight of the aqueous medium. If the above addition amount is smaller than 20 parts by weight, then there is a possibility that the resultant microcapsules may have a broad particle diameter distribution, thus bringing about the deterioration of the production efficiency. If the above addition amount is larger than 200 parts by weight, then there is a possibility that a reversed suspension may be formed, so that no microcapsule can be produced.

In the second manufacturing process according to the present invention, if necessary, subsequent to the aforementioned microcapsulating step, a microcapsule, obtained by this step, for an electrophoretic display device may be isolated or concentrated prior to the aforementioned step (A). For example, in cases where the microcapsulation is carried out in the aqueous medium like in such as coacervation method, the microcapsule can be isolated or concentrated by separating it from such as the aqueous medium by such as suction filtration or natural filtration.

After or before the above isolation, the microcapsules may be classified in order to obtain microcapsules for an electrophoretic display device wherein the microcapsules have a narrower particle size distribution. For example, it is preferable to adopt a wet type classification manner (wet classification). As to the wet classification, thereto the aforementioned explanations about the "wet classification" in the first manufacturing process according to the present invention can be applied in the same way.

In addition, for removing impurities to enhance the product quality, it is also favorable to perform an operation in which a microcapsule, obtained by the microcapsulating step, for an electrophoretic display device is washed after having been subjected to the above isolation-concentration and/or classification if necessary.

The aqueous medium which can be used in the step (A) is not limited. For example, water or a mixture of a hydrophilic organic solvent and water can be used. When the hydrophilic organic solvent and water are used jointly, the ratio of blending water is preferably 95 to 70% by weight, more preferably 95 to 80% by weight.

The above hydrophilic organic solvent is not limited. However, examples thereof include the same as cited as examples of the "hydrophilic organic solvent" usable as an aqueous medium in the first manufacturing process according to the present invention.

Incidentally, in the second manufacturing process according to the present invention, there can be a mode in which a microcapsule, obtained by the aforementioned manufacturing method involving the microcapsulating step, for an electrophoretic display device is once isolated and then blended with the above aqueous medium to carry out the step (A). However, there is no limitation to this mode. For example, in cases where the manufacturing method in which the aqueous medium is used in the microcapsulating step is applied like in such as the aforementioned coacervation method, a part or the whole of this aqueous medium can be substituted as a part or the whole of the aqueous medium being used in the step (A).

In the step (A), the ratio of blending the microcapsule (to be caused to exist in the aqueous medium) for an electrophoretic display device is not limited. However, for example, this ratio is preferably 5 to 50% by weight, more preferably 10 to 40% by weight, still more preferably 15 to 30% by weight, in terms of solid component content, relative to the whole liquid after the blending with the aqueous medium. Regarding the above amount of the microcapsule, if the above blending ratio is smaller than 5% by weight, then there is a possibility of resulting in leaving a large amount of wastewater and therefore being uneconomical. If the above blending ratio is larger than 50% by weight, then there is a possibility of resulting in such a high viscosity that uniform blending or stirring cannot be carried out.

The ion-exchange resin usable in the step (A) is not limited. For example, as cation-exchange resins, it is possible to favorably use publicly known strongly acidic cation-exchange resins such as DowX 50WX1 (manufactured by The Dow Chemical Company), AMBERLITE IR118 (manufactured by Organo Co., Ltd.), and Duolite SC100 (manufactured by Sumitomo Chemical Co., Ltd.). In addition, as anion-exchange resins, it is possible to favorably use publicly known strongly basic anion-exchange resins such as OH-substituted product of DowX 1X1 (manufactured by The Dow Chemical Company), OH-substituted product of AMBERLITE IRA400 (manufactured by Organo Co., Ltd.), and Diaion TSA1200 (manufactured by Mitsubishi Chemical Corporation). Generally, some microcapsules contain both cation and anion in a shell, and other microcapsules become easy to agglomerate by removing either cation or anion. Therefore it is desired to jointly use the cation-exchange resin and the anion-exchange resin.

The ratio of blending the ion-exchange resin (to be caused to exist in the aqueous medium) is not limited. However, this ratio is preferably 0.1 to 50% by weight, more preferably 0.5 to 20% by weight, still more preferably 1 to 10% by weight, in terms of solid component content, relative to the microcapsule (to be blended into the aqueous medium) for an electrophoretic display device. If the above blending ratio is smaller than 0.1% by weight, then there is a possibility of resulting in incomplete removal of ions. If the above blending ratio is larger than 50% by weight, then there is a possibility of resulting in obtaining no effect corresponding to the blending ratio and therefore being uneconomical.

In cases where, as mentioned above, the cation-exchange resin and the anion-exchange resin are jointly used as the ion-exchange resin, their blending ratio "anion-exchange resin/cation-exchange resin" (volume ratio) is not limited. However, it is preferably not larger than 1, more preferably not larger than 0.9, still more preferably not larger than 0.8. If the above blending ratio is larger than 1, then there is a possibility that the amine-derived compound which is attached to the anion-exchange resin may tend to remain in the shell of the microcapsule. In addition, the total blending ratio of the cation-exchange resin and the anion-exchange resin to the whole ion-exchange resin is not limited. However, it is preferably not smaller than 0.2% by weight, more preferably not smaller than 1% by weight, still more preferably not smaller than 2% by weight, in terms of solid component content. If the above blending ratio is smaller than 0.2% by weight, then there is a possibility of resulting in failure to sufficiently remove ions.

In the step (A), the above microcapsule is caused to coexist with the ion-exchange resin in the aqueous medium.

The mode that the microcapsule is caused to coexist with the ion-exchange resin in the aqueous medium in the step (A) is not limited. However, examples thereof include: a mode in which the microcapsule is stirred in the presence of the ion-exchange resin in the aqueous medium; and a mode in which a microcapsule-dispersed liquid is passed through a filter packed with the ion-exchange resin.

In cases of the mode in which the microcapsule is stirred in the presence of the ion-exchange resin in the aqueous medium, then the stirring which is carried out in the presence of the ion-exchange resin in the step (A) may be carried out by any of publicly known various stirring means and is therefore not limited. The time needed for the above stirring is not limited. However, for example, it is preferably 1 to 24 hours, more preferably 2 to 12 hours.

In the second manufacturing process according to the present invention, it is favorable that the microcapsule (to be caused to exist in the aqueous medium in the step (A)) for an electrophoretic display device includes an addition product of a polyethylene glycol chain (which may hereinafter be referred to as PEG chain) to a surface of the shell of the microcapsule. In detail, it is favorable that the above addition product of the PEG chain is formed before or when the microcapsule is caused to coexist with the ion-exchange resin in the aqueous medium. The present inventors have obtained findings that, if, as mentioned above, the ion-exchange resin and the microcapsule for an electrophoretic display device are caused to coexist in the aqueous medium, then there is a case where the microcapsule deteriorates in dispersibility so much as to secondarily agglomerate. The secondary agglomeration of the microcapsule would be a cause that, when thereafter a paint is prepared by adding such as a binder to the microcapsule and then coated to a surface of a base material for an electrode, then the coating cannot be carried out or non-uniformity occurs to the coated surface to thus result in failure to uniformly arrange the microcapsule on the surface of the base material for the electrode. Thus, the present inventors have found out that, as a means of preventing and suppressing the above secondary agglomeration, it is effective to form the addition product of the PEG chain to a surface of the shell of the microcapsule before or during the above stirring in the presence of the ion-exchange resin.

The above PEG chain is a polymer chain of preferably 2 to 50, more preferably 3 to 40, still more preferably 4 to 30, in number "n" of repeating units derived from ethylene glycol or ethylene oxide. If the above number "n" of the repeating units is smaller than 2, then there is a possibility that the effect of suppressing the secondary agglomeration cannot sufficiently be obtained. If the above number "n" of the repeating units is larger than 50, then there is a possibility that the PEG chain addition product portion may be difficult to dissolve into the aqueous medium.

It is favorable that the above addition product of the PEG chain is specifically formed in a way that: a compound having both a PEG chain and an epoxy group (in detail, a compound having an epoxy group at an end or opposite ends of a PEG chain) is used and this compound and the aforementioned microcapsule are stirred together in an aqueous medium.

As the aqueous medium usable in the above stirring, there can favorably be applied the same as aforementioned as the aqueous medium usable in the step (A). The above stirring may be carried out in another step prior to the step (A) or may be carried out together in the step (A), thus not being limited.

The amount in which the above compound having both a PEG chain and an epoxy group is used may be set appropriately for giving such an amount of the PEG chain addition product as can suppress the secondary agglomeration on a desired level. Therefore, there is no limitation. However, for example, it is preferably 2 to 50% by weight, more preferably 5 to 40% by weight, still more preferably 10 to 30% by weight, in terms of solid component content, relative to the microcapsule for an electrophoretic display device. If the above use amount is smaller than 2% by weight, then there is a possibility that the effect of suppressing the secondary agglomeration of the microcapsule cannot sufficiently be obtained. If the above use amount is larger than 50% by weight, then there is a possibility of resulting in failure to obtain the above effect corresponding to the use amount and therefore being uneconomical.

In the second manufacturing process according to the present invention, generally, a step of removing the ion-exchange resin is carried out after the step (A). Specifically, it is enough to filter off the ion-exchange resin with a filter, having a mesh opening size smaller than the size (particle diameter) of the ion-exchange resin, after the step (A).

In the second manufacturing process according to the present invention, it is possible that: as mentioned above as the operation subsequent to the microcapsulating step, such as suction filtration or natural filtration is carried out, if necessary, whereby the aqueous medium containing the microcapsule for an electrophoretic display device is concentrated or this microcapsule is separated and isolated from such as the aqueous medium. In addition, it is also possible to carry out: an operation of carrying out classification (e.g. wet classification) in order to obtain microcapsules for an electrophoretic display device wherein the microcapsules have a narrower particle size distribution; or an operation of washing the resultant microcapsule for an electrophoretic display device in order to remove impurities to enhance the product quality.

Hereinafter, an explanation is given about a microcapsule for an electrophoretic display device wherein the microcapsule is obtained by the second manufacturing process according to the present invention.

The microcapsule, obtained by the second manufacturing process according to the present invention, for an electrophoretic display device is such that: the amount of the ionic substance in the whole microcapsule is reduced, and the reduction in later contrast can be suppressed even when the electrophoretic display device using this microcapsule is allowed to stand under the high temperature and high humidity condition. Specifically, the amount (total amount) of the ions (such as sodium ion, potassium ion, magnesium ion, calcium ion, chloride ion, sulfate ion, carbonate ion, and acetate ion) in the whole microcapsule is preferably not larger than 200 ppm, more preferably not larger than 150 ppm, still more preferably not larger than 100 ppm. If the above ion amount is larger than 200 ppm, then there is a possibility that the contrast may reduce when the electrophoretic display device using the above microcapsule is allowed to stand under the high temperature and high humidity condition.

Inter alia, it is preferable to reduce the amount of the sodium ion, because thereby the above effect of suppressing the reduction in contrast can still more be enhanced. Specifically, the amount of the sodium ion is preferably not larger than 150 ppm, more preferably not larger than 100 ppm, still more preferably not larger than 80 ppm, particularly preferably not larger than 50 ppm, in the whole microcapsule.

Furthermore, it is favorable that the microcapsule, obtained by the second manufacturing process according to the present invention, for an electrophoretic display device, at the same time, further satisfies the aforementioned requirement as the microcapsule according to the present invention, namely, such that the amount (concentration) of the alkaline metal ions comprising $Li^+$, $Na^+$, $K^+$, $Rb^+$, $Cs^+$, and $Fr^+$ should be 150 ppm or smaller, preferably 120 ppm or smaller, more preferably 100 ppm or smaller, in the whole microcapsule. The microcapsule which further satisfies the aforementioned requirement as the microcapsule according to the present invention could further give the effect that the reduction in later contrast can be suppressed even when the electrophoretic display device using this microcapsule is allowed to stand under the high temperature and high humidity condition for a long time (e.g. under 60° C., 90% RH for 24 hours).

In addition, prior electrophoretic display devices in which TFT electrodes are used as display electrodes contacting with a microcapsule have had a problem that an ionic substance inhibits the actions of the TFT to thereby disable the proper control of the devices. However, if the above microcapsule, obtained by the second manufacturing process according to the present invention, for an electrophoretic display device, specifically, the microcapsule for an electrophoretic display device such that the amount of the ions (particularly that of the sodium ion) in the whole microcapsule is reduced, is used, then there can be an effect that even the above problem can be solved all at once.

As to the particle diameter (volume average particle diameter), variation coefficient of particle diameter (volume average particle diameter), and thickness of shell, of the microcapsule, obtained by the second manufacturing process according to the present invention, for an electrophoretic display device, thereto the aforementioned explanations about the "particle diameter (volume average particle diameter)", "variation coefficient of particle diameter (volume average particle diameter)", and "thickness of shell", respectively, of the microcapsule according to the present invention can be applied in the same way.

The particle diameter, and its variation coefficient (i.e. narrowness of particle size distribution), of the microcapsule, obtained by the second manufacturing process according to the present invention, for an electrophoretic display device depend much on the particle diameter and particle size distribution of the dispersion liquid dispersed into the aqueous medium in the microcapsulating step, for example, in cases where manufacturing methods using such as coacervation method are applied. Therefore, similarly to the aforementioned microcapsule according to the present invention, a microcapsule having a desired particle diameter and its variation coefficient can be obtained by carrying out the microcapsulating step under conditions appropriately controlled.

The microcapsule, obtained by the second manufacturing process according to the present invention, for an electrophoretic display device can, similarly to the aforementioned microcapsule according to the present invention, be used for all of various display devices (e.g. the uses aforementioned about the microcapsule according to the present invention) to which the electrophoretic display device can be applied.

[Sheet for Electrophoretic Display Device]:

The sheet (display sheet) according to the present invention for an electrophoretic display device is a sheet comprising the above microcapsule according to the present invention and a binder resin. More particularly, for example, a sheet having a layer in which the microcapsule according to the present invention is arranged so that the whole becomes planar is fixed with a binder resin so as to easily maintain the arrangement is preferable. By using the microcapsule according to the present invention as a microcapsule in the display sheet, the aforementioned object of the present invention can be easily attained.

The binder resin is not limited, but preferable examples include various organic binder resins, and examples include synthetic resin-based binders such as an acryl resin based, a polyester resin based, a fluorine resin based, an alkyd resin based, an amino resin based, a vinyl resin based, an epoxy resin based, a polyamide resin based, a polyurethane resin based, an unsaturated polyester resin based, a phenol resin based, a polyolefin resin based, a silicone resin based, an acrylsilicone resin based, a xylene resin based, a ketone resin based, a rosin-modified maleic acid resin based, liquid polybutadiene and a coumarone resin; natural or synthetic rubber-based binders such as an ethylene-propylene copolymer rubber, a polybutadiene rubber, a styrene-butadiene rubber and an acrylonitrile-butadiene copolymer rubber; natural resin-based binders such as shellac, rosin (pine resin), ester gum, hardened rosin, decolored shellac and white shellac; thermoplastic or thermosetting polymer-based binders such as cellulose nitrate, cellulose acetate butyrate, cellulose acetate, ethyl cellulose, hydroxypropylmethyl cellulose and hydroxyethyl cellulose. The synthetic resin-based binder may be a plastic (thermoplastic binder), or may be a curing (thermally curing, ultraviolet-ray curing, electron beam curing or wet curing) such as an acryl based, a methacryl based and an epoxy based. These organic binders may be used alone, or two or more kinds may be used, being not limiting.

A form of a binder is not limited, but examples include solvent soluble type, water-soluble type, emulsion type and dispersion type (arbitrary solvent such as water/organic solvent).

Examples of the water-soluble type binder include a water-soluble alkyd resin, a water-soluble acryl-modified alkyd resin, a water-soluble oil free alkyd resin (water-soluble polyester resin), a water-soluble acryl resin, a water-soluble epoxy ester resin and a water-soluble melamine resin.

Examples of the emulsion-type binder include an alkyl (meth)acrylate-copolymerized dispersion, a vinyl acetate resin emulsion, a vinyl acetate-copolymerized resin emulsion, an ethylene-vinyl acetate-copolymerized resin emulsion, an acrylic acid ester (co)polymerized resin emulsion, a styrene-acrylic acid ester (co)polymerized resin emulsion, an epoxy resin emulsion, a urethane resin emulsion, an acryl-silicone emulsion and a fluorine resin emulsion.

The display sheet according to the present invention may be a sheet consisting of the microcapsule according to the present invention and a binder resin, or may be provided with other constituent parts or constituent components in addition to the microcapsule according to the present invention and a binder resin, being not limiting. Preferable examples of the latter display sheet include a display sheet in which a layer containing the microcapsule according to the present invention and a binder resin is formed on a film-like or sheet-like substrate, or a substrate such as another film is further arranged via the layer after the formation (the layer is laminated with a film-like substrate), and the layer and the substrate are incorporated. The latter form is preferable in that a manufacturing process is easy, and it can be manufactured while property of the microcapsule according to the present invention is easily retained.

Since the display sheet according to the present invention is a display sheet for an electrophoretic display device, when it is also provided with the film-like substrate (in the case of the aforementioned latter display sheet), as the substrate, an electrically conductive film is used as the substrate. Examples of the electrically conductive film include an electrode film which can be used as an electrode for an electrophoretic display device. For example, the film may be an opaque electrode film, or a transparent electrode film (e.g. PET film with ITO), being not limiting. A transparent electrode film is preferable and, in particular, as described above, when a layer containing the microcapsule according to the present invention and a binder resin is laminated with two counter electrode films, it is necessary that at least one electrode film is transparent.

The process for manufacturing the display sheet according to the present invention is not limited, but generally, as described in detail below, a method of mixing the microcapsule according to the present invention and a binder resin to obtain a paint, and coating the paint on a surface of a film-like or sheet-like substrate, and drying it is preferably adopted. When a display sheet in which a layer containing the microcapsule according to the present invention and a binder resin, and a substrate are incorporated is obtained, it may be handled as it is after the drying. But, when a display sheet of only the aforementioned layer is obtained, only the layer is isolated (peeled) from the substrate after the drying. In addition, when a display sheet in which the layer is laminated with the substrate is obtained, a substrate may be further overlaid on a coated surface after the drying, and this may be laminated.

A concentration of a microcapsule in the paint is not limited, but is preferably 30 to 70% by weight, more preferably 30 to 60% by weight, further preferably 30 to 55% by weight. When a microcapsule concentration is within the aforementioned range, for example, a product in which one layer of the microcapsule according to the present invention is densely arranged on a substrate (electrode film etc.) can be obtained and, when the display sheet according to the present invention is used in an electrophoretic display device, excellent product quality (display quality) is exerted.

A viscosity of the paint is preferably 500 to 5000 mPa·s, more preferably 800 to 4000 mPa·s, further preferably 800 to 3000 mPa·s. When a viscosity of the paint is within the aforementioned range, one layer of the microcapsule according to the present invention can be arranged on a substrate (electrode film etc.) without a gap, and this can be finished into a coated film (coated layer) in the state where the microcapsule according to the present invention is densely filled.

The paint can contain other components as necessary in addition to the microcapsule according to the present invention and a binder resin. Examples of other components include a viscosity adjusting agent, a leveling agent and an anti-foaming agent. A ratio of other components to be blended can be appropriately set in such as range that effect of the present invention is not prevented.

A method of coating the paint on a substrate is not limited, but for example, a method of coating on a substrate one by one using an applicator or a blade coater, or a method of continuously coating on a substrate using a continuous coating machine such as multicoater may be used, and the method can be appropriately selected as necessary.

A drying method after the coating is not limited, but the known drying technique and drying conditions can be adopted.

A thickness of the display sheet according to the present invention is not limited due to balance with a particle diameter of the microcapsule to be used. A thickness of only a part of a layer containing the microcapsule and a binder resin is preferably 10 to 250 µm, more preferably 10 to 180 µm, further preferably 10 to 100 µm. When the thickness is less than 10 µm, in the case where the display sheet according to the present invention is used in an electrophoretic display device, a sufficient display concentration is not obtained at a display part, and there is a possibility that clear discrimination from other undisplayed part cannot be performed. When the thickness exceeds 250 µm, in the case where the display sheet according to the present invention is used in an electrophoretic display device, it becomes necessary to enhance a starting voltage in order to sufficiently exert electrophoretic property of an electrophoretic fine particle in a dispersion liquid encapsulated in a microcapsule, and this may be inferior in economical property. When the film-like or sheet-like substrate is used, a thickness of the substrate is not limited, but tens of µm to several mm is preferable.

When the aforementioned laminated display sheet is obtained as the display sheet according to the present invention, as a lamination method, the known laminating technique or laminating conditions can be adopted.

When the display sheet according to the present invention is the aforementioned laminated display sheet, in order to obtain an electrophoretic display device which can stably exert excellent display quality, generally, it is preferable that the microcapsule according to the present invention is sufficiently adhered to both electrode films (contact area is great). When adherability with both electrode films is low, there is a possibility that reduction in responsiveness of an electrophoretic fine particle, and reduction in contrast occur. In order to enhance this adherability, for example, enhancement of a temperature and a pressure at lamination can be contemplated. In addition, regarding a microcapsule to be used, by appropriately setting a ratio of component constituting a shell to be contained, and enhancing flexibility and adherability, easiness of adhesion to an electrode film can be further enhanced and, in that case, sufficient adherability can be obtained even in the state where various conditions such as a temperature and a pressure at lamination are mild to some extent.

In the case of a laminated display sheet as described above, a clearance between counter electrode films is not limited, but is preferably 10 to 250 µm, more preferably 10 to 180 µm, further preferably 10 to 100 µm. When the clearance is less than 10 µm, in the case where the display sheet according to the present invention is used in an electrophoretic display device, there is a possibility that a sufficient display concentration is not obtained at a display part, and clear discrimination from other undisplayed part cannot be performed. When the clearance exceeds 250 µm, in the case where the display sheet according to the present invention is used in an electrophoretic display device, in order to sufficiently exert electrophoretic property of an electrophoretic fine particle in a dispersion liquid encapsulated in a microcapsule, it becomes necessary to enhance a starting voltage, and this is inferior in economical property.

The display sheet according to the present invention is a sheet for an electrophoretic display device, but it is also possible to use this sheet for the same uses as of publicly known display sheets involving the use of microcapsules, such as non-carbon paper and pressure measuring film.

[Electrophoretic Display Device]:

The electrophoretic display device according to the present invention is provided with a sheet for an electrophoretic display device, wherein the sheet comprises: the above microcapsule according to the present invention; and a binder resin (in other words, the electrophoretic display device according to the present invention is provided with the above display sheet according to the present invention). A favorable mode of the electrophoretic display device according to the present invention is that the aforementioned sheet for an electrophoretic display device is a sheet in which a layer containing the microcapsule and the binder resin is formed on an electrically conductive film.

The electrophoretic display device according to the present invention can be manufactured from the aforementioned display sheet according to the present invention. To the sheet for an electrophoretic display device, which sheet is used for the electrophoretic display device according to the present invention, there can be applied the explanations aforementioned in the section hereof entitled "[Sheet for electrophoretic display device]". For example, there can be preferably exemplified an electrophoretic display device containing, as a constituent part, a display sheet in which a layer containing a microcapsule and a binder resin are laminated with two counter electrode films among the aforementioned display sheet according to the present invention. The electrophoretic display device according to the present invention, which involve the use of the display sheet according to the present invention, could easily attain the aforementioned object of the present invention.

In the electrophoretic display device according to the present invention, as various constituent parts other than the display sheet (e.g. driving circuit and electric source circuit), constituent parts which are used in the hitherto publicly known electrophoretic display device can be adopted.

Required display action in the electrophoretic display device according to the present invention can be performed by applying a controlled voltage between counter electrode films (for example, applying a voltage to only a part on which a desired image is wanted to be displayed), and changing an orientation position of an electrophoretic fine particle in a microcapsule.

DETAILED DESCRIPTION OF THE PREFERRED EMBODIMENTS

The present invention will be explained more specifically below by way of Examples and Comparative Examples, but the present invention is not limited to them. Hereinafter, for convenience, "liter" is similarly referred to as "L" in some cases. In addition, "% by weight" is referred to as "wt %" in some cases.

The amount of ions (amount of alkaline metal ions or amount of sodium ion) in Examples and Comparative Examples was measured in the following way.

<Amount of Various Ions>:

An outline of a method of measuring the amount of various ions is shown in the following 1 to 3.

1. 1 g of a microcapsule is placed into 20 g of super-pure water, and this is irradiated with an ultrasound for 45 minutes using an ultrasonic cleaner (180 W, 42 kHz).

2. A liquid after ultrasonic irradiation is filtered with a filter having a mesh opening size of 0.45 μm.

3. The amount of various ions in a filtrate is measured using an ICP atomic emission spectrometer.

Specifically, 1 g of a pre-dried microcapsule was precisely weighed, and this with 20 g of super-pure water was placed into a 50 mL plastic container (product name: PP Vial PV-7, manufactured by Sogo Laboratory Glass Works Co., Ltd.), this was irradiated with an ultrasound for 45 minutes using an ultrasonic cleaner (product name: Bronson 5510, manufactured by Yamato Scientific Co., Ltd., output: 180 W, frequency: 45 kHz), and a procedure of extracting various ions was performed.

After ultrasonic irradiation, a liquid in the aforementioned container was filtered with a filter (product name: GL Chromatodisk 131, manufactured by Kurabo Industries, Ltd., mesh opening size: 0.45 μm), and the amount (ppm) of various ions in the filtrate which had been passed through a filter was measured using an ICP atomic emission spectrometer (product name: Inductively Coupled Plasma Atomic Emission Spectrometer, manufactured by Seiko Instruments Inc.).

The amount (ppm) of various ions in the whole microcapsule was obtained as a value obtained by multiplying the amount (ppm) of various ions in the filtrate with a dilution-fold ratio of a microcapsule (20-fold (super-pure water 20 g/microcapsule 1 g)).

EXAMPLES BY FIRST MANUFACTURING PROCESS AND THEIR COMPARATIVE EXAMPLES

Measuring methods in the below-mentioned Examples and Comparative Examples will be shown below.

<Average Particle Diameter of Microcapsule>:

A volume average particle diameter of a microcapsule was measured using a laser diffraction/scattering-type particle size distribution measuring apparatus (product name: LA-910 manufactured by Horiba, Ltd.).

<Solubility in Water>:

25.0 g of a sample compound (e.g. epoxy compound such as compound (B)) is precisely weighed in a 300 mL beaker, 225 g of water is added, and this is vigorously stirred with a magnetic stirrer for 1 hour to dissolve the sample compound. Thereafter, this is allowed to stand for 1 hour, an undissolved sample compound (oil) which has been settled on a bottom of a beaker is extracted, placed into a 10 mL (or 5 mL) measuring cylinder, this is further allowed to stand for 30 minutes, a liquid amount (mL) of the sample compound (oil) is read down to the first decimal place, and that value is substituted into the following equation to calculate a solubility (%) of the sample compound in water.

$$\text{Solubility in water (\%)}=100-(A/21)\times 100$$

(wherein A represents a read liquid amount (mL) of a sample compound)

<Contrast>:

Reflectances of white display and blue display (or black display), when a series voltage of 15V was applied between both electrodes of the electrophoretic display device for 0.4 second, were measured, respectively, using a Macbeth spectrophotodensitometer (product name: SpectroEye manufactured by GretagMacbeth), and the contrast (reflectance ratio) was determined by the following equation. Incidentally, the reflectances of white display and blue display (or black display) were measured separately by application by switching the poles, and each reflectance is defined as a value obtained by measurement regarding the whole one side of the electrophoretic display device.

$$\text{Contrast}=(\text{white display reflectance})/(\text{blue display (or black display) reflectance})$$

Synthesis Example 1-1

A 300 mL separable flask was initially charged with 14.5 g of polyethylenimine (product name: Epomin SP006 (Mw=600), manufactured by Nippon Shokubai Co., Ltd.) and 43.5 g of water and, thereafter, 97.2 g of a 25 wt % aqueous solution of an epoxy compound (lauryl polyoxyethylene (n=22) glycidyl ester, solubility in water: 100%) which had been prepared in advance was added dropwise over 10 minutes under stirring.

The addition dropwise was performed while maintaining a liquid temperature in a flask at 25° C. or lower, stirring was continued for 30 minutes after completion of addition and, thereafter, a temperature was raised to 70° C., and retained at the same temperature for 2 hours, and this was cooled to a normal temperature to obtain a compound (A1) of 25 wt % in solid component content having dispersibility.

Synthesis Example 1-2

According to the same manner as that of Synthesis Example 1-1 except that 130.4 g of a 25 wt % aqueous solution of an epoxy compound (lauryl polyoxyethylene (n=44) glycidyl ester, solubility in water: 100%) which had been prepared in advance was added dropwise over 10 minutes under stirring, after initial charging, in Synthesis Example 1-1, a compound (A2) of 25 wt % in solid component content having dispersibility.

Synthesis Example 1-3

The same flask as that of Synthesis Example 1-1 was initially charged with 14.5 g of polyethylenimine (product name: P-1000 (Mw=70,000), manufactured by Nippon Shokubai Co., Ltd.) and 43.5 g of water and, thereafter, 130.4 g of a 25 wt % aqueous solution of an epoxy compound (lauryl polyoxyethylene (n=44) glycidyl ester, solubility in water: 100%) which had been prepared in advance was added dropwise over 10 minutes under stirring.

Thereafter, as in Synthesis Example 1-1, a compound (A3) of 25 wt % in solid component content having dispersibility was obtained.

Synthesis Example 1-4

A 500 mL separable flask was initially charged with 93.7 g of an aqueous polyacrylic acid solution (product name: Aqualic HL-415 (Mw=10,000, resin concentration: 45 wt %), manufactured by Nippon Shokubai Co., Ltd.) and 281.1 g of water and, thereafter, 20 g of a 25 wt % aqueous solution of an epoxy compound (phenolpolyoxyethylene (n=5) glycidyl ester, solubility in water: 100%) which had been prepared in advance was added dropwise over 10 minutes under stirring.

The addition dropwise was performed while maintaining a liquid temperature in a flask at 25° C. or lower, stirring was continued for 30 minutes after completion of addition dropwise and, thereafter, a temperature was raised to 70° C., and retained at the same temperature for 2 hours, and this was cooled to a normal temperature to obtain a compound (A4) of 25 wt % in solid component content having dispersibility.

Synthesis Example 2-1

A 300 mL four-necked flask was charged with 100 g of titanium oxide (product name: Tipaque CR-97, manufactured by Ishihara Sangyo Kaisha, Ltd.), 100 g of n-hexane and 4 g of octadecyltrichlorosilane (product name: LS6495, manufactured by Shin-etsu Chemical Co., Ltd.), the flask was placed in an ultrasonic bath (bath in which an ultrasound was generated by an ultrasonic homogenizer (product name: BRANSON5210, manufactured by Yamato)) of 55° C. while stirring and mixing, and coupling agent treatment was performed for 2 hours while performing ultrasonic dispersion.

This dispersion liquid was transferred to a centrifugation settlement tube, a settlement procedure was performed with a centrifuge (product name: high speed cooling centrifuge GRX-220, manufactured by Tomi) at 10000 G for 15 minutes and, thereafter, the supernatant of a settlement tube was removed to obtain surface-treated titanium oxide (p1).

11.5 g of titanium oxide (p1) and 1.5 g of an anthraquinone-based blue dye were placed in 82 g of dodecylbenzene, dispersion treatment was performed in the aforementioned ultrasonic bath for 2 hours to obtain a dispersion liquid (1) for an electrophoretic display device.

Synthesis Example 2-2

A 200 mL beaker was charged with 5 g of carbon black (product name: MA100, manufactured by Mitsubishi Chemical Corporation) and 172.5 g of methyl methacrylate, dispersion treatment was performed with an ultrasonic homogenizer (product name: BRANSON5210, manufactured by Yamato), and 3.5 g of azobisbutyronitrile was added to dissolve the material to obtain a monomer composition.

An aqueous solution in which 2.5 g of an anionic surfactant (product name: Hitenol NO8) was dissolved in 750 g of water was prepared in advance, an all amount of the aforementioned monomer composition was added thereto, and this was subjected to dispersion treatment with a high speed stirring emulsifying machine (product name: Clear Mix CLM-0.8S, manufactured by M Technique), to obtain a suspension of the monomer composition.

This suspension was raised to a temperature of 75° C., and retained for 5 hours to perform a polymerization reaction, thereby, a dispersion of a black fine particle was obtained. A particle diameter (volume average particle diameter) of this black fine particle was measured using a laser diffraction/scattering-type particle size distribution measuring apparatus (produce name: LA-910, manufactured by Horiba, Ltd.), and found to be 0.8 μm. The dispersion was filtered, washed and dried to obtain a black fine particle (p2).

3.1 g of a black fine particle (p2) and 11.5 g of titanium oxide (p1) obtained in Synthesis Example 2-1 were placed in 85.6 g of dodecylbenzene, and this was dispersion-treated for 2 hours in an ultrasonic bath used in Synthesis Example 2-1, to obtain a dispersion liquid (2) for an electrophoretic display device.

Example 1-1

40 g of a compound (A1) and 60 g of water were placed in a 500 mL flat-bottom separable flask, 95 g of a dispersion liquid (1) for an electrophoretic display device was added under stirring with a disper (product name: ROBOMICS, manufactured by Tokushu Kika Kogyo Co., Ltd.) and, thereafter, a stirring rate was gradually increased, followed by stirring at 800 rpm for 5 minutes to obtain a suspension.

While maintaining this suspension at 30° C., all amount of an aqueous solution obtained by dissolving 10 g of polyglycerol polyglycidyl ester (product name: Denacol EX521, manufactured by Nagase Chemtex, solubility in water: 100%) as an epoxy compound (compound (B)) in 80 g of water was added dropwise for 10 minutes under stirring, and all amount of an aqueous solution obtained by dissolving 2 g of sodium diethyl thiocarbamate trihydrate in 100 g of water was added dropwise over 10 minutes. Thereafter, a temperature of a suspension was raised to 70° C. over 60 minutes, and retained at the same temperature for 1 hour to perform aging.

After aging, this was cooled to a normal temperature to obtain a dispersion liquid of a microcapsule (m1) for an electrophoretic display device. A volume average particle diameter of the microcapsule (m1) for an electrophoretic display device was 65.0 μm.

This suspension was classified through meshes having mesh opening pore diameters of 80 μm and 30 μm, to obtain a paste (solid component content: 63 wt %) of a microcapsule (m1) for an electrophoretic display device having a particle diameter of 30 to 80 μm.

This paste was dried in a hot air dryer at 50° C. for 24 hours to obtain only a microcapsule (m1) for an electrophoretic display device and, according to the aforementioned method, an amount of an alkaline metal ion in the whole microcapsule (m1) for an electrophoretic display device was measured. Results are shown in Table 1.

Then, 2.1 g of an alkali-soluble type acryl resin emulsion (product name: WR503A, manufactured by Nippon Shokubai Co., Ltd., resin content: 30 wt %) was diluted with water so that the solid component content became 5 wt %, and 0.2 g of a 25 wt % aqueous ammonia was added thereto to obtain a solution of the alkali-soluble type acryl resin.

12.8 g of this resin solution was added to 10 g of the paste, and this was mixed with a mixing machine (product name: Awatori Neritarou AR-100, manufactured by Thinky) for 10 minutes to obtain a coating solution.

This coating solution was coated on a PET film with ITO with an applicator, and dried at 90° C. for 10 minutes to obtain a sheet (1) for an electrophoretic display device.

Another PET film with ITO was overlaid on a coating side of a sheet (s1) for an electrophoretic display device, and laminated to prepare an electrophoretic display device (d1) having counter electrodes. The electrophoretic display device (d1) was allowed to stand in a constant temperature and constant humidity chamber at 20° C. and 50% RH for 1 day, and contrast (A) was measured under the same temperature and same humidity environment.

Then, this electrophoretic display device (d1) was placed in a constant temperature and constant humidity equipment (product name: constant temperature and constant humidity equipment PL-ZF-P2, manufactured by Daiken Rikagaku Kiki) at 60° C. and 90% RH for 24 hours (moisture resistance test), allowed to stand in a constant temperature and constant humidity chamber at 20° C. and 50% RH for 1 hour, and contrast (B) was measured under the same temperature and same humidity environment.

Results of measurement of contrast (A) before a moisture resistance test and contrast (B) after a moisture resistance test are shown in Table 1.

Example 1-2

According to the same manner as that of Example 1-1 except that a compound (A2) was used in place of a compound (A1), and 100.2 g of a dispersion liquid (2) for an electrophoretic display device was used in place of 95 g of a dispersion liquid (1) for an electrophoretic display device in Example 1-1, a dispersion liquid of a microcapsule (m2) for an electrophoretic display device was obtained. A volume average particle diameter of the microcapsule (m2) for an electrophoretic display device was 68.0 μm.

This dispersion liquid was classified through meshes of mesh opening pore diameters of 80 μm and 30 μm to obtain a paste (solid component content: 55 wt %) of the microcapsule (m2) for an electrophoretic display device having a particle diameter of 30 to 80 μm.

According to the same manner as that of Example 1-1, this paste was used to measure an amount of an alkaline metal ion in the whole microcapsule (m2) for an electrophoretic display device. Results are shown in Table 1.

Then, according to the same manner as that of Example 1-1 except that an amount of the paste to be added to an acryl resin solution was 11.5 g, a coating solution was obtained.

Thereafter, according to the same manner as that of Example 1-1, a sheet (s2) for an electrophoretic display device was obtained, and an electrophoretic display device (d2) was prepared.

According to the same manner as that of Example 1-1, regarding an electrophoretic display device (d2), contrast (A) before a moisture resistance test and contrast (B) after a moisture resistance test were measured. Results are shown in Table 1.

Example 1-3

According to the same manner as that of Example 1-1 except that a compound (A3) was used in place of a compound (A1) in Example 1-1, a dispersion liquid of a microcapsule (m3) for an electrophoretic display device was obtained. A volume average particle diameter of a microcapsule (m3) for an electrophoretic display device was 71.0 nm.

This dispersion liquid was classified through meshes having mesh opening pore diameters of 80 μm and 30 μm to obtain a paste (solid component content: 66.5 wt %) of a microcapsule (m3) for an electrophoretic display device having a particle diameter of 30 to 80 μm.

According to the same manner as that of Example 1-1, this paste was used to measure an amount of an alkaline metal ion in the whole microcapsule (m3) for an electrophoretic display device. Results are shown in Table 1.

Then, according to the same manner as that of Example 1-1 except that an mount of the paste to be added to an acryl resin solution was 9.5, a coating solution as obtained.

Thereafter, according to the same manner as that of Example 1-1, a sheet (s3) for an electrophoretic display device was obtained, and an electrophoretic display device (d3) was prepared.

According to the same manner as that of Example 1-1, regarding an electrophoretic display device (d3), contrast (A) before a moisture resistance test and contrast (B) after a moisture resistance test were measured. Results are shown in Table 1.

Example 1-4

According to the same manner as that of Example 1-1 except that a compound (A4) was used in place of a compound (A1) in Example 1-1, a dispersion liquid of a microcapsule (m4) for an electrophoretic display device was obtained. A volume average molecular weight of a microcapsule (m4) for an electrophoretic display device was 66.0 μm.

This dispersion liquid was classified through meshes having mesh opening pore diameters of 80 μm and 30 μm to obtain a paste (solid component content: 57.8 wt %) of a microcapsule (m4) for an electrophoretic display device having a particle diameter of 30 to 80 μm.

According to the same manner as that of Example 1-1, this paste was used to measure an amount of an alkaline metal ion in the whole microcapsule (m4) for an electrophoretic display device. Results are shown in Table 1.

Then, according to the same manner as that of Example 1-1 except that an amount of the paste to be added to an acryl resin solution was 10.9 g, a coating solution was obtained.

Thereafter, according to the same manner as that of Example 1-1, a sheet (s4) for an electrophoretic display device was obtained, and an electrophoretic display device (d4) was prepared.

According to the same manner as that of Example 1-1, regarding an electrophoretic display device (d4), contrast (A) before a moisture resistance test and contrast (B) after a moisture resistance test were measured. Results are shown in Table 1.

Comparative Example 1-1

A 500 mL flat-bottom separable flask was charged with 60 g of water, 6 g of gum arabic and 6 g of gelatin, and the materials were dissolved.

While retaining this solution at 43° C., 95 g of a dispersion liquid (1) for an electrophoretic display device warmed at 50° C. was added under stirring with a disper (product name: ROBOMICS, manufactured by Tokushu Kika Kogyo Co., Ltd.), thereafter, a stirring rate was gradually increased, and the material was stirred at 1200 rpm for 30 minutes to obtain a suspension. While 300 mL of warm water at 43° C. was added to this suspension, a stirring rate was gradually reduced.

About 11 mL of a 10 wt % aqueous acetic acid solution was quantitatively added over 22 minutes under such the stirring that the whole suspension could be retained in the uniform state with a paddle stirring wing, a pH was adjusted to 4.0, and this was cooled to 10° C.

The suspension was retained in the cooled state for 2 hours, 3 mL of a 37 wt % aqueous formalin solution was added, and 22 mL of a 10 wt % aqueous $Na_2CO_3$ solution was quantitatively added over 25 minutes.

Further, a temperature of the suspension was returned to a normal temperature, and this was retained for 20 hours to age it to obtain a suspension of a microcapsule (cm1) for an electrophoretic display device. A volume average particle diameter of a microcapsule (cm1) for an electrophoretic display device was 51.1 μm.

This dispersion liquid was classified through meshes having mesh opening pore diameters of 80 μm and 30 μm to obtain a paste (solid component content: 57 wt %) of a microcapsule (cm1) for an electrophoretic display device having a particle diameter of 30 to 80 μm.

According to the same manner as that of Example 1-1, this paste was used to measure an amount of an alkaline metal ion in the whole microcapsule (cm1) for an electrophoretic display device. Results are shown in Table 1.

According to the same manner as that of Example 1-1 except that an amount of the paste to be added to an acryl rein solution was 11.1 g, a coating solution was obtained.

Thereafter, according to the same manner as that of Example 1-1, a sheet (cs1) for an electrophoretic display device was obtained, and an electrophoretic display device (cd1) was prepared.

According to the same manner as that of Example 1-1, regarding an electrophoretic display device (cd1), contrast (A) before a moisture resistance test and contrast (B) after a moisture resistance test were measured. Results are shown in Table 1.

product name: Polyment SK-1000) and 30.4 parts of urethane emulsion (manufactured by Dai-ichi Kogyo Seiyaku Co., Ltd., product name: Superflex 107M) were mixed together, and then thereto there were added 4.6 parts of strongly basic anion-exchange resin (manufactured by Mitsubishi Chemical Corporation, product name: Diaion TSA1200) and 4.6 parts of strongly acidic cation-exchange resin (manufactured by Sumitomo Chemical Co., Ltd., product name: Duolite SC100), and then the resultant mixture was stirred at room temperature for 12 hours. After this stirring, the mixture was filtrated with a 100-mesh metal gauze, thus obtaining a binder dispersion liquid (solid component content: 36 wt %).

Amount of 10 parts (in terms of solid component content) of the resultant concentrated liquid of microcapsules for an electrophoretic display device and 1.1 parts (in terms of solid component content) of the above binder dispersion liquid were mixed together, and then thereto there was added deionized water appropriately to prepare a paint composition of 40 wt % in solid component content. The dispersibility of the microcapsules in this paint composition (whether agglomeration was seen or not) was observed with an optical microscope.

The above paint composition was coated to an ITO/PET film (manufactured by Toray Industries, Inc., product name: High Beam NT02) of 125 μm in thickness by use of a doctor blade of 100 μm in cleararice. As to a paint composition which could be coated, it was dried at room temperature for 1 hour and then in a hot-air drier of 90° C. for 20 minutes. The appearance of a surface of a paint film (whether it was uniform or non-uniform), after the drying, was observed by the eye.

The coatability of the above paint composition was evaluated on the following standards.

⊚: There is no agglomeration of microcapsules in the paint composition, and the surface of the paint film is uniform.

TABLE 1

|  |  | Microcapsule | | Electrophoretic display device | | |
|---|---|---|---|---|---|---|
|  | Kind | Volume average particle diameter (μm) | Amount of alkaline metal ion (ppm) | Contrast (A) | Contrast (B) | Change of contrast (B) − (A) |
| Example 1-1 | (m1) | 65.0 | 21.6 | 5.2 | 5.0 | −0.2 |
| Example 1-2 | (m2) | 68.7 | 43.1 | 8.6 | 7.8 | −0.8 |
| Example 1-3 | (m3) | 71.1 | 97.7 | 4.6 | 3.3 | −1.3 |
| Example 1-4 | (m4) | 66.0 | 50.1 | 5.0 | 4.2 | −0.8 |
| Comparative Example 1-1 | (cm1) | 51.1 | 201.1 | 4.9 | 2.8 | −2.1 |

EXAMPLES BY SECOND MANUFACTURING PROCESS AND THEIR COMPARATIVE EXAMPLES

Measuring methods and evaluation methods in the below-mentioned Examples and Comparative Examples will be shown below.

<Evaluation of Coatability>:

An amount of 200 parts of ethylenimine-modified acrylic emulsion (manufactured by Nippon Shokubai Co., Ltd., ○: There is no agglomeration of microcapsules in the paint composition, but the surface of the paint film is a little non-uniform.

Δ: There is a little agglomeration of microcapsules in the paint composition, and the surface of the paint film is also a little non-uniform.

X: There is too much agglomeration of microcapsules in the paint composition to coat it.

<Measurement of Leaking Electric Current Amount>:

In the same way as of the above description about the evaluation of coatability, a paint composition including microcapsules for an electrophoretic display device was obtained and then coated to a PET film with ITO and then dried, thus obtaining a sheet for an electrophoretic display device.

A polyimide film with copper foil was stacked on the coated surface of the above sheet and laminated under vacuum at 60° C., thus preparing an electrophoretic display device.

The above electrophoretic display device was allowed to stand in a constant temperature and constant humidity chamber at 23° C. and 65% RH for 1 hour. Thereafter, under the same temperature and same humidity environment, a voltage of 10 V was applied between both electrodes of the device (between ITO and Cu) with a high resistance meter for 2 minutes to measure the amount of a flowing electric current (leaking electric current amount).

Next, this electrophoretic display device was placed in a constant temperature and constant humidity equipment at 60° C. and 90% RH for 2 hours (moisture resistance test) and then allowed to stand in a constant temperature and constant humidity chamber at 25° C. and 40% RH for 1 hour. Thereafter, under the same temperature and same humidity environment, the amount of an electric current flowing between both electrodes (leaking electric current amount) was measured in the same way as aforementioned.

A case where the leaking electric current amount was not larger than 50 nA/cm$^2$ was judged passing as the product quality.

<Evaluation of Contrast>:

The electrophoretic display device, having been prepared in the same way as of the above description about the measurement of the leaking electric current amount, was allowed to stand in a constant temperature and constant humidity chamber at 23° C. and 65% RH for 1 hour. Thereafter, under the same temperature and same humidity environment, the contrast (A) was measured in the following way. That is to say, reflectances of white display and blue display (or black display), when a series voltage of 15V was applied between both electrodes of the electrophoretic display device for 0.4 second, were measured, respectively, using a Macbeth spectrophotodensitometer (product name: SpectroEye manufactured by GretagMacbeth), and the contrast (reflectance ratio) was determined by the following equation. Incidentally, the reflectances of white display and blue display (or black display) were measured separately by application by switching the poles, and each reflectance is defined as a value obtained by measurement regarding the whole one side of the electrophoretic display device.

Contrast=(white display reflectance)/(blue display (or black display) reflectance)

Next, this electrophoretic display device was placed in a constant temperature and constant humidity equipment at 60° C. and 90% RH for 2 hours (moisture resistance test) and then allowed to stand in a constant temperature and constant humidity chamber at 25° C. and 40% RH for 1 hour. Thereafter, under the same temperature and same humidity environment, the contrast (B) was measured in the same way as aforementioned.

Example 2-1

An amount of 0.5 part of aminopropyltrimethoxysilane (manufactured by Shin-etsu Chemical Co., Ltd., product name: KBM-903) was mixed and uniformly dissolved into 90 part of methanol, and then thereto there was added 0.5 part of 25 wt % aqueous ammonia. To the resultant solution, there was added 50 parts of titanium oxide (manufactured by Ishihara Sangyo Kaisha, Ltd., product name: Tipaque CR-90), and then the temperature was adjusted to 50° C. under stirring, and then an ultrasonic dispersing treatment was carried out for 60 minutes. Thereafter, 1.5 parts of isopropyltriisostearoyl titanate (manufactured by Ajinomoto Co., Ltd., product name: Purenakuto KR-TTS) was added, and then the same dispersing treatment was carried out for another 60 minutes. The resultant dispersion liquid was subjected to centrifugal separation to recover a sediment, and this sediment was dried at 120° C., thus obtaining surface-treated titanium oxide particles (p).

Separately, 19 parts of isopropyltriisostearoyl titanate (manufactured by Ajinomoto Co., Ltd., product name: Purenakuto KR-TTS) was added to 546 parts of dodecylbenzene and, while being caused to bubble with air of 10 mL/minute and nitrogen of 20 mL/minute, the resultant mixture was heated at 200° C. for 4.5 hours, thus obtaining a heat-treated dispersant solution (d).

To 207 parts of dodecylbenzene, there were added 43 parts of the above titanium oxide particles (p) and 61 parts of the above dispersant solution (d), and then the temperature was adjusted to 50° C., and then an ultrasonic dispersing treatment was carried out for 30 minutes. Thereafter, 5 parts of a blue dye (manufactured by Chuo Gosei Kagaku Co., Ltd., product name: Oil Blue F) was added and dissolved into the resultant dispersion, thus obtaining a dispersion liquid (D) for an electrophoretic display device.

Beforehand, 24 parts of gum arabic (manufactured by Wako Pure Chemical Industries, Ltd.) and 8 parts of gelatin (manufactured by Wako Pure Chemical Industries, Ltd.) were dissolved into 180 parts of water, and the resultant solution was adjusted to a temperature of 43° C. Then, to this solution, there was added 316 parts of the dispersion liquid (D) (having been adjusted to the same temperature) for an electrophoretic display device under stirring with a disper, thus obtaining a suspension of this dispersion liquid (D).

To the resultant suspension, there were added 799 parts of warm water and 48 parts of urethane emulsion (manufactured by Dai-ichi Kogyo Seiyaku Co., Ltd., product name: Superflex 700), and then there was added 20 parts of 10 wt % aqueous acetic acid solution, and then the resultant mixture was cooled to 10° C. to carry out coacervation. After this cooling, 10 parts of 37 wt % aqueous formalin solution and 45 parts of 10 wt % aqueous sodium carbonate solution were added, and then the temperature was raised to room temperature to carry out aging for 90 minutes. Thereafter, an aziridine compound (manufactured by Nippon Shokubai Co., Ltd., product name: Kemitaito PZ-33) was added, and then the temperature was raised to 50° C. to carry out aging for another 60 minutes, thus obtaining a dispersion liquid of microcapsules (M) for an electrophoretic display device.

The dispersion liquid of microcapsules (M) for an electrophoretic display device was cooled to room temperature and then classified with a sieve of 106 μm in mesh opening size. A dispersion liquid having passed through this sieve was transferred into a separatory funnel, and then 1,000 parts of deionized water was added thereto to carry out washing of the microcapsules (M) for an electrophoretic display device, and then the materials were left undisturbed for 6 hours. Thereafter, a lower layer in the separatory funnel was extracted. Next, the residual upper layer was subjected to the above classification and washing in the same way 3 times. Then, an upper layer having remained lastly was recovered from the separatory funnel and then subjected to suction filtration with a filter paper, thus obtaining a concentrated liquid of the microcapsules (M) for an electrophoretic display device.

This concentrated liquid was dried with hot air of 110° C. and then measured by solid component content. As result, it was 50 wt %. In addition, the particle diameters of the microcapsules (M) for an electrophoretic display device were measured with a laser diffraction/scattering-type particle size distribution measuring apparatus (manufactured by Horiba, Ltd., produce name: LA-910). As result, the volume average particle diameter was 70 μm.

To the concentrated liquid of the microcapsules (M) for an electrophoretic display device, there was added deionized water appropriately for the solid component content to be adjusted to 25 wt %. To 200 parts of this adjusted liquid, there were added 2.5 parts of strongly basic anion-exchange resin (manufactured by Mitsubishi Chemical Corporation, product name: Diaion TSA1200) and 2.5 parts of strongly acidic cation-exchange resin (manufactured by Sumitomo Chemical Co., Ltd., product name: Duolite SC100), and then the resultant mixture was stirred at room temperature for 12 hours.

After this stirring, the mixture was filtrated with a sieve of 300 μm in mesh opening size. The resultant filtrate was subjected to suction filtration with a filter paper, thus obtaining a concentrated liquid of microcapsules (M1) for an electrophoretic display device.

The resultant concentrated liquid was used to carry out the measurement of the amount of ions in the whole microcapsules (M1) for an electrophoretic display device, the evaluation of the coatability, the measurement of the leaking electric current, and the evaluation of the contrast in the aforementioned ways. Their results are shown in Table 2.

Example 2-2

To the concentrated liquid of the microcapsules (M), having been obtained from Example 2-1, for an electrophoretic display device, there was added deionized water appropriately for the solid component content to be adjusted to 25 wt %. To 200 parts of this adjusted liquid, there was added 50 parts of 10 wt % aqueous polyethylene glycol diglycidyl ether (manufactured by Nagase Chemtex, product name: Denacol EX-841) solution, and then the resultant mixture was adjusted to a temperature of 50° C. and then stirred for 90 minutes and then cooled to room temperature. After this cooling, there were added 2.5 parts of strongly basic anion-exchange resin (manufactured by Mitsubishi Chemical Corporation, product name: Diaion TSA1200) and 2.5 parts of strongly acidic cation-exchange resin (manufactured by Sumitomo Chemical Co., Ltd., product name: Duolite SC100), and then the resultant mixture was stirred at room temperature for 12 hours.

After this stirring, the mixture was filtrated with a sieve of 300 μm in mesh opening size. The resultant filtrate was subjected to suction filtration with a filter paper, thus obtaining a concentrated liquid of microcapsules (M2) for an electrophoretic display device.

The resultant concentrated liquid was used to carry out the measurement of the amount of ions in the whole microcapsules (M2) for an electrophoretic display device, the evaluation of the coatability, the measurement of the leaking electric current, and the evaluation of the contrast in the aforementioned ways. Their results are shown in Table 2.

Comparative Example 2-1

The concentrated liquid of the microcapsules (M), having been obtained from Example 2-1, for an electrophoretic display device was used to carry out the measurement of the amount of ions in the whole microcapsules (M) for an electrophoretic display device, the evaluation of the coatability, the measurement of the leaking electric current, and the evaluation of the contrast in the aforementioned ways. Their results are shown in Table 2.

TABLE 2

| | $Na^+$ amount (ppm) | Coatability | Leaking electric current amount (nA/cm$^2$) Before moisture resistance test | Leaking electric current amount (nA/cm$^2$) After moisture resistance test | Contrast (A) | Contrast (B) | Change of contrast (B) − (A) |
|---|---|---|---|---|---|---|---|
| Example 2-1 | 50 | ○ | 12 | 20 | 4.5 | 4.3 | 0.2 |
| Example 2-2 | 50 | ⊚ | 12 | 25 | 4.3 | 4.0 | 0.3 |
| Comparative Example 2-1 | 180 | ⊚ | 12 | 100 | 4.5 | 3.2 | 1.3 |

INDUSTRIAL APPLICATION

The microcapsule and sheet according to the present invention for an electrophoretic display device can be suitably used for various electrophoretic display devices such as a so-called digital paper (electronic paper) such as a paper-like display and a rewritable paper, a display device such as an IC card and an IC tag, an electronic white board, a guiding plate, an advertising plate, an electronic newspaper, an electronic book and a portable end (e.g. PDA) in addition to a normal electrophoretic display panel.

The first and second manufacturing processes according to the present invention are suitable as methods of easily obtaining a microcapsule for an electrophoretic display device wherein the amount of ions in the whole microcapsule is reduced. Above all, the first manufacturing process according to the present invention is a method of easily obtaining a microcapsule for an electrophoretic display device wherein the amount of alkaline metal ions in the whole microcapsule is reduced to a particular value or smaller, and this process is particularly suitable as a method of easily obtaining the above microcapsule according to the present invention.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A process for manufacturing a microcapsule for an electrophoretic display device, which comprises the following steps of: dispersing a core substance into an aqueous medium containing a water-soluble surfactant wherein the core substance is a liquid containing a hydrophobic solvent and an electrophoretic fine particle; and thereafter adding a water-soluble compound to the aqueous medium; thereby forming a shell on a surface of the core substance;
wherein:
a compound (A) represented by the following general formula (1):

$$R^1-(CH_2-CH_2-O-)_n-X-R^2 \quad (1)$$

wherein $R^1$ represents an aliphatic or aromatic hydrophobic group of a carbon number of 5 to 25, $R^2$ represents a polymer group having a polyamine structure or a polycarboxylic acid structure of a weight average molecular weight of 300 to 100,000, n represents an integer of 3 to 85, and X represents a group which is derived from a group capable of reacting with at least one kind of group selected from the group consisting of an amino group, an imino group and a carboxyl group, and is formed after the reaction, but it doesn't matter whether X is present or not,
is used as the water-soluble surfactant, and a compound (B) having an epoxy group or an episulfide group is used as the water-soluble compound; and
the shell is formed by reacting the compound (A) and the compound (B).

2. The process according to claim 1 for manufacturing a microcapsule for an electrophoretic display device, wherein the microcapsule contains an ionic substance, which further comprises the following step of: causing the obtained microcapsule to coexist with an ion-exchange resin in an aqueous medium so that the ionic substance is removed or desalted from the microcapsule.

3. The process according to claim 2 for manufacturing a microcapsule for an electrophoretic display device, wherein a strongly acidic cation-exchange resin and a strongly basic anion-exchange resin are jointly used as the ion-exchange resin.

4. The process according to claim 3 for manufacturing a microcapsule for an electrophoretic display device, wherein the microcapsule includes an addition product of a polyethylene glycol chain to a surface of the shell of the microcapsule.

5. The process according to claim 2 for manufacturing a microcapsule for an electrophoretic display device, wherein the microcapsule includes an addition product of a polyethylene glycol chain to a surface of the shell of the microcapsule.

6. The process according to claim 5 for manufacturing a microcapsule for an electrophoretic display device, wherein the addition product of the polyethylene glycol chain is formed by stirring a compound and the microcapsule together in an aqueous medium wherein the compound has both a polyethylene glycol chain and an epoxy group.

7. The process of claim 2, wherein the coexistence of the microcapsule with the ion—exchange resin in the aqueous medium is carried out in a mode that the microcapsule is stirred in the presence of the ion—exchange resin in the aqueous medium.

8. The process of claim 1, wherein the microcapsule has an alkaline metal ion content of 150 ppm or smaller.

9. The process of claim 1, wherein the group represented by X is not present in the general formula (1) when the compound (A) is a product prepared from a compound represented by the following general formula (2) and a polyamine or polycarboxylic acid,
wherein the general formula (2) is:

$$R^1-(CH_2-CH_2-O-)_{n-1}-X^1 \quad (2)$$

wherein $X^1$ represents a group represented by the following structural formula (a):

so that the compound (A) is represented by the following general formula:

$$R^1-(CH_2-CH_2-O-)_n-R^2.$$

10. The process of claim 1, wherein the group represented by X is at least one member selected from the group consisting of —$CH_2$—$CH_2$—S—, —NH—CO—, —CO—NH—$CH_2$—$CH_2$—, —CH(OH)—, —CO—, —NH—, and =N—.

* * * * *